US012341370B2

(12) United States Patent
Chen et al.

(10) Patent No.: US 12,341,370 B2
(45) Date of Patent: Jun. 24, 2025

(54) BATTERY POWER REGULATION CIRCUIT, REGULATION METHOD, CHARGING CABLE AND TERMINAL EQUIPMENT

(71) Applicant: Meizu Technology Co., Ltd., Zhuhai (CN)

(72) Inventors: Jia Chen, Zhuhai (CN); Xiaoyong Liu, Zhuhai (CN)

(73) Assignee: Meizu Technology Co., Ltd., Zhuhai (CN)

( * ) Notice: Subject to any disclaimer, the term of this patent is extended or adjusted under 35 U.S.C. 154(b) by 0 days.

(21) Appl. No.: 18/684,630

(22) PCT Filed: Oct. 18, 2021

(86) PCT No.: PCT/CN2021/124493
§ 371 (c)(1),
(2) Date: Apr. 29, 2024

(87) PCT Pub. No.: WO2023/019713
PCT Pub. Date: Feb. 23, 2023

(65) Prior Publication Data
US 2024/0333013 A1    Oct. 3, 2024

(30) Foreign Application Priority Data

Aug. 17, 2021  (CN) .......................... 202110942372.6

(51) Int. Cl.
*H02J 7/00* (2006.01)
*H02J 7/06* (2006.01)
(52) U.S. Cl.
CPC ...... *H02J 7/00712* (2020.01); *H02J 7/00036* (2020.01); *H02J 7/0045* (2013.01);
(Continued)

(58) Field of Classification Search
CPC ................................................... H02M 1/0095
See application file for complete search history.

(56) References Cited

U.S. PATENT DOCUMENTS 10,321,539 B1 * 6/2019 Borghetti ............... H05B 45/38
10,903,742 B2 * 1/2021 Hou ......................... H02M 3/07
(Continued)

FOREIGN PATENT DOCUMENTS

CN    106532831 A    3/2017
CN    106787055 A *  5/2017 ............ H01M 10/44
(Continued)

OTHER PUBLICATIONS

CN-106787055 translation, Liu, Charging Circuit, Has Control Module for Sending Control Signal to Charge Pump, (Year: 2017).*
(Continued)

*Primary Examiner* — Tynese V McDaniel
(74) *Attorney, Agent, or Firm* — Jaffery Watson Hamilton & DeSanctis LLP

(57) ABSTRACT

Disclosed herein are a battery power supply adjusting circuit and method, a charging cable, and a terminal device. The circuit is configured to charge a dual-cell battery (010). The circuit comprises a Buck circuit module (110), a first charge pump circuit module (120), a second charge pump circuit module (130), a battery charging and discharging control module (140), and a system power supply module (150). An input of the Buck circuit module (110) and an input of the first charge pump circuit module (120) are externally connected with an AC/DC adapter (020), respectively. The first charge pump circuit module (120) and the second charge pump circuit module (130) are respectively connected to the dual-cell battery (010). The second charge pump circuit module (130) is also connected to the system power supply module (150).

13 Claims, 6 Drawing Sheets

(52) U.S. Cl.
CPC .............. *H02J 7/0063* (2013.01); *H02J 7/06* (2013.01); *H02J 2207/20* (2020.01)

(56) References Cited

U.S. PATENT DOCUMENTS

| | | | | |
|---|---|---|---|---|
| 11,509,146 | B1* | 11/2022 | Zhang | H02J 7/00714 |
| 2002/0027467 | A1* | 3/2002 | Henry | H02M 3/07 |
| | | | | 327/536 |
| 2011/0204959 | A1* | 8/2011 | Sousa | H02M 3/07 |
| | | | | 327/536 |
| 2013/0069614 | A1* | 3/2013 | Tso | H02M 3/07 |
| | | | | 323/288 |
| 2015/0077175 | A1* | 3/2015 | Giuliano | H02M 3/07 |
| | | | | 327/536 |
| 2015/0077176 | A1* | 3/2015 | Szczeszynski | G05F 3/02 |
| | | | | 327/536 |
| 2015/0162828 | A1* | 6/2015 | Sandner | H02J 7/02 |
| | | | | 323/271 |
| 2016/0020693 | A1* | 1/2016 | Ribarich | H02M 3/07 |
| | | | | 363/60 |
| 2017/0271873 | A1* | 9/2017 | Huang | H02J 7/34 |
| 2018/0041060 | A1* | 2/2018 | Walley | H02J 7/0045 |
| 2018/0337545 | A1* | 11/2018 | Crosby | H02J 7/00712 |
| 2019/0190281 | A1* | 6/2019 | Huang | H02J 7/00 |
| 2020/0161976 | A1* | 5/2020 | Song | H02M 3/158 |
| 2020/0303927 | A1 | 9/2020 | Tian | |
| 2020/0343757 | A1* | 10/2020 | Tian | H02J 7/00712 |
| 2021/0067033 | A1* | 3/2021 | Jing | H02M 3/158 |
| 2022/0337078 | A1* | 10/2022 | Shao | H02M 3/07 |
| 2023/0006555 | A1* | 1/2023 | Jung | H02M 3/07 |
| 2023/0026736 | A1* | 1/2023 | Liu | H02M 1/0095 |
| 2023/0047446 | A1* | 2/2023 | Liu | H02J 7/0016 |
| 2023/0078732 | A1* | 3/2023 | Liu | H01M 10/44 |
| | | | | 320/148 |
| 2023/0089638 | A1* | 3/2023 | Liu | H02M 3/072 |
| | | | | 320/106 |
| 2024/0039334 | A1* | 2/2024 | Wang | H02J 50/80 |
| 2024/0047985 | A1* | 2/2024 | Giuliano | H02M 1/10 |
| 2024/0055881 | A1* | 2/2024 | Deng | H02J 7/007 |

FOREIGN PATENT DOCUMENTS

| | | |
|---|---|---|
| CN | 109787318 A | 5/2019 |
| EP | 3309924 A1 | 4/2018 |
| WO | 2020124529 A1 | 6/2020 |

OTHER PUBLICATIONS

International Searching Authority (ISA)/CN, International Preliminary Report on Patentability for PCT/CN2021/124493, issued Feb. 13, 2024, 5 pages.

International Searching Authority (ISA)/CN, International Search Report for PCT/CN2021/124493, issued May 17, 2022, 5 pages.

International Searching Authority (ISA)/CN, Written Opinion for PCT/CN2021/124493, issued May 17, 2022, 4 pages.

European Patent Office, Extended European Search Report for European Patent Application No. 21953949.1, mailed Nov. 18, 2024, 9 pages.

* cited by examiner

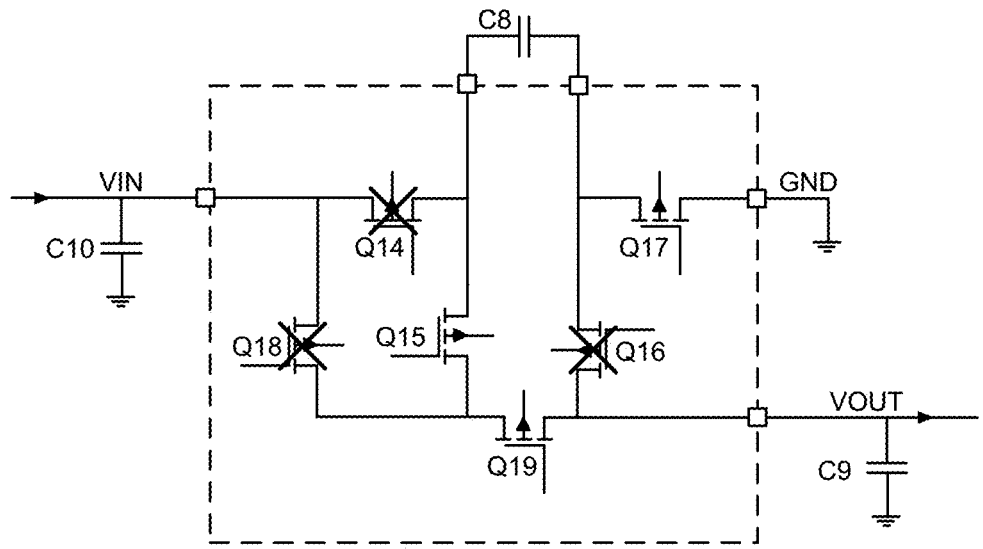

FIG. 16

| Collecting, by the battery charging and discharging control module, a charging voltage and a charging current of the dual-cell battery in real time, and determining the charging and discharging phases of the dual-cell battery based on the charging voltage and the charging current | ← S410 |

↓

| In the trickle charging phase, controlling, by the battery charging and discharging control module, the Buck circuit module and the second charge pump circuit module to be turned on to work, wherein the second charge pump circuit module plays a boosting role | ← S420 |

↓

| In the constant-current charging phase, controlling, by the battery charging and discharging control module, the first charge pump circuit module to be turned on to operate to make the output current of the first charge pump circuit module smaller than the input current, and make the output voltage of the first charge pump circuit module smaller than the input voltage | ← S430 |

↓

| In the constant-voltage charging phase and the charging cut-off phase, controlling, by the battery charging and discharging control module, the first charge pump circuit module to be turned off | ← S440 |

↓

| In the discharging phase, controlling, by the battery charging and discharging control module, the second charge pump circuit module to be turned on to convert the discharging voltage of the dual-cell battery into the voltage suitable for the system power supply module | ← S450 |

FIG. 17

BATTERY POWER REGULATION CIRCUIT, REGULATION METHOD, CHARGING CABLE AND TERMINAL EQUIPMENT

CROSS-REFERENCES TO RELATED APPLICATIONS

The present disclosure is a national stage application of PCT application No. PCT/CN2021/124493, filed on Oct. 18, 2021, entitled "BATTERY POWER SUPPLY ADJUSTING CIRCUIT AND METHOD, CHARGING CABLE AND TERMINAL DEVICE," which claims the priority of Chinese patent application No. 202110942372.6, filed on Aug. 17, 2021, with the China National Intellectual Property Administration, entitled "BATTERY POWER SUPPLY ADJUSTING CIRCUIT AND METHOD, CHARGING CABLE AND TERMINAL DEVICE," the entire contents of each of which are incorporated herein by reference.

TECHNICAL FIELD

The present disclosure relates to the technical field of battery charging, and particularly to a battery power supply adjusting circuit and method, a charging cable, and a terminal device.

BACKGROUND

A rechargeable battery is rechargeable, has limited charging times, and may be used with a recharger. By charging the battery, the battery is reusable, which is beneficial for meeting the needs of economy and environmental protection. A charging process of the battery is a reverse process of a discharging process, and is specifically a process of converting electric energy into chemical energy stored in the battery.

At present, in terminal devices, single-cell batteries are mainly used for charging. However, when the single-cell battery is fully charged, a voltage of the single-cell battery is about 4.5 V, and when a charging current exceeds 8 A, a circuit board of a battery end will generate heat seriously. Therefore, a battery connector usually needs to be replaced with a battery connector with a smaller impedance and larger current flow, which leads to an increase in hardware cost; meanwhile, wiring and heat dissipation in the circuit board of the battery end will be more difficult. In order to meet the heat dissipation demand, the charging power of the battery end of the single-cell battery is about 36 W, which leads to low charging efficiency.

SUMMARY

(I) Technical Problem to be Solved

The technical problem to be solved by the present disclosure is to solve the problem of low charging efficiency caused by charging of an existing single-cell battery.

(II) Technical Solution

In order to solve the above technical problem, an embodiment of the present disclosure provides a battery power supply adjusting circuit and method, a charging cable and a terminal device, which can improve charging efficiency.

In a first aspect, the present disclosure provides a battery power supply adjusting circuit, which is configured to charge a double-cell battery, wherein the circuit comprises a Buck circuit module, a first charge pump circuit module, a second charge pump circuit module, a battery charging and discharging control module and a system power supply module.

An input of the Buck circuit module and an input of the first charge pump circuit module are externally connected to an AC/DC adapter respectively, a first output of the Buck circuit module is connected to the second charge pump circuit module, a second output of the Buck circuit module is connected to the system power supply module, the battery charging and discharging control module is connected to a controlled end of the Buck circuit module, a controlled end of the first charge pump circuit module, a controlled end of the second charge pump circuit module and the double-cell battery, the first charge pump circuit module and the second charge pump circuit module are respectively connected to the double-cell battery, and the second charge pump circuit module is further connected to the system power supply module.

The battery charging and discharging control module is a control module for controlling the Buck circuit module, the first charge pump circuit module and the second charge pump circuit module to operate during charging and discharging.

The Buck circuit module operates in a trickle charging phase, a constant-voltage charging phase and a charging cut-off phase; and on one hand, the Buck circuit module is configured to supply power to the system power supply module, and on the other hand, the Buck circuit module charges the dual-cell battery after being boosted by the second charge pump circuit module.

The first charge pump circuit module operates in a constant-current charging phase, and is a circuit module for making an output current of the first charge pump circuit module smaller than an input current, and making an output voltage of the charge pump circuit module smaller than an input voltage.

The second charge pump circuit module operates during discharging, and is a circuit module for converting a discharging voltage of the dual-cell battery into a voltage suitable for the system power supply module.

In some embodiments, the Buck circuit module comprises a Buck controller, an input capacitor, an output capacitor, an output inductance, and a charging voltage and current controller. The Buck controller comprises a first transistor and a second transistor.

Battery information of a battery being charged is transmitted to the charging voltage and current controller. The first transistor and the output inductance are connected in series between the AC/DC adapter and the battery being charged. The input capacitor is connected in series between an input of the first transistor and the ground. The output capacitor is connected in series between an output of the output inductance and the ground. One end of the second transistor is connected between the first transistor and the output inductance, and the other end of the second transistor is grounded. The battery being charged is a battery in the dual-cell battery or a battery in the power supply system module.

During charging of the output inductance, the first transistor is turned on and the second transistor is turned off.

During discharging of the output inductance, the first transistor is turned off and the second transistor is turned on.

In some embodiments, the first charge pump circuit module comprises N charge pump circuit submodules arranged in parallel; $N \geq 1$ and N is an integer.

The controlled ends of the N charge pump circuit submodules are respectively connected to the battery charging and discharging control module.

In some embodiments, the charge pump circuit submodule comprises a first capacitor, a second capacitor, a third capacitor, a fourth transistor, a fifth transistor, and a sixth transistor.

An input of the third transistor and one end of the third capacitor are connected to the AC/DC adapter, the other end of the third capacitor is grounded, an output of the third transistor and an input of the fourth transistor are both connected to a first end of the first capacitor, the other end of the first capacitor is connected to an input of the sixth transistor and an output of the fifth transistor, an output of the sixth transistor is grounded, an output of the fourth transistor, an input of the fifth transistor and one end of the second capacitor are all connected to the double-cell battery, and the other end of the second capacitor is grounded.

In a series connection phase of the capacitors, the third transistor and the fifth transistor are turned on, and the fourth transistor and the sixth transistor are turned off.

In a parallel connection phase of the capacitors, the fourth transistor and the sixth transistor are turned on, and the third transistor and the fifth transistor are turned off.

In some embodiments, the charge pump circuit submodule comprises a fourth capacitor, a fifth capacitor, a sixth capacitor, a seventh capacitor, a seventh transistor, an eighth transistor, a ninth transistor, a tenth transistor, an eleventh transistor, a twelfth transistor, and a thirteenth transistor.

One end of the fourth capacitor and an input of the seventh transistor are both connected to the AC/DC adapter. The other end of the fourth capacitor is grounded. An output of the seventh transistor and an input of the eighth transistor are both connected to one end of the fifth capacitor, the other end of the fifth capacitor is connected to an input of the ninth transistor and an input of the tenth transistor. An output of the ninth transistor and an output of the thirteenth transistor are both grounded. An input of the thirteenth transistor and an output of the twelfth transistor are both connected to one end of the sixth capacitor. The other end of the sixth capacitor is connected to an output of the tenth transistor and an output of the eleventh transistor, an output of the eighth transistor, an input of the eleventh transistor, an input of the twelfth transistor, and one end of the seventh capacitor are all connected to the double-cell battery, and the other end of the seventh capacitor is grounded.

In a series connection phase of the capacitors, the seventh transistor, the tenth transistor and the twelfth transistor are turned on, and the eighth transistor, the ninth transistor, the eleventh transistor, and the thirteenth transistor are turned off; and In a parallel connection phase of the capacitors, the eighth transistor, the ninth transistor, the eleventh transistor, and the thirteenth transistor are turned on, and the seventh transistor, the tenth transistor, and the twelfth transistor are turned off.

In some embodiments, the second charge pump circuit module comprises an eighth capacitor, a ninth capacitor, a tenth capacitor, a fourteenth transistor, a fifteenth transistor, a sixteenth transistor, a seventeenth transistor, an eighteenth transistor, and a nineteenth transistor.

One end of the eighth capacitor is connected to an output of the fourteenth transistor and an input of the fifteenth transistor, the other end of the eighth capacitor is connected to an output of the sixteenth transistor and an input of the seventeenth transistor. An output of the seventeenth transistor is grounded. An input of the fourteenth transistor, an input of the eighteenth transistor and one end of the tenth capacitor are all connected to the AC/DC adapter. The other end of the tenth capacitor is grounded. An output of the eighteenth transistor and an output of the fifteenth transistor are both connected to an input of the nineteenth transistor. An input of the sixteenth transistor, an output of the nineteenth transistor and one end of the ninth capacitor are all connected to the double-cell battery, and the other end of the ninth capacitor is grounded.

During the charging of the dual-cell battery, the operation phase of the second charge pump circuit module comprises a first charging phase and a first discharging phase.

In the first charging phase, the fourteenth transistor and the seventeenth transistor are turned on, and the fifteenth transistor, the sixteenth transistor, the eighteenth transistor, and the nineteenth transistor are turned off.

In the first discharging phase, the fifteenth transistor, the sixteenth transistor, and the eighteenth transistor are turned on, and the fourteenth transistor, the seventeenth transistor, and the nineteenth transistor are turned off.

During the discharging of the dual-cell battery, the operation phase of the second charge pump circuit module comprises a second charging phase and a second discharging phase.

In the second charging phase, the fourteenth transistor and the sixteenth transistor are turned on, and the fifteenth transistor, the seventeenth transistor, the eighteenth transistor, and the nineteenth transistor are turned off.

In the second discharging phase, the fifteenth transistor, the seventeenth transistor, and the nineteenth transistor are turned on, and the fourteenth transistor, the sixteenth transistor, and the eighteenth transistor are turned off.

In a second aspect, the present disclosure further provides a battery power supply adjusting method, which is executed based on the battery power supply adjusting circuit according to any one of the embodiments above. The method comprises:

collecting, by the battery charging and discharging control module, a charging voltage and a charging current of the dual-cell battery in real time, and determining the charging and discharging phases of the dual-cell battery based on the charging voltage and the charging current;

in the trickle charging phase, controlling, by the battery charging and discharging control module, the Buck circuit module and the second charge pump circuit module to be turned on to operate, wherein the second charge pump circuit module plays a boosting role;

in the constant-current charging phase, controlling, by the battery charging and discharging control module, the first charge pump circuit module to be turned on to operate to make the output current of the first charge pump circuit module smaller than the input current, and make the output voltage of the first charge pump circuit module smaller than the input voltage;

in the constant-voltage charging phase and the charging cut-off phase, controlling, by the battery charging and discharging control module, the first charge pump circuit module to be turned off; and in the discharging phase, controlling, by the battery charging and discharging control module, the second charge pump circuit module to be turned on to convert the discharging voltage of the dual-cell battery into the voltage suitable for the system power supply module.

In some embodiments, the determining the charging and discharging phases of the dual-cell battery based on the charging voltage and the charging current, comprises:

identifying, by the charging and discharging control module, a port type of the AC/DC adapter to determine a voltage threshold and a current threshold; and comparing, by the charging and discharging control module, the charging voltage collected in real time with the voltage threshold, and comparing the charging current collected in real time with the current threshold to determine the charging and discharging phases of the dual-cell battery.

In a third aspect, the present disclosure further provides a charging cable, which comprises the battery power supply adjusting circuit according to any of the embodiments above.

In a fourth aspect, the present disclosure further provides a terminal device, which comprises a dual-cell battery, wherein the dual-cell battery is charged by the battery power supply adjusting circuit according to any one of the embodiments above, or charged utilizing the battery power supply adjusting method according to any one of the embodiments above, or charged on the basis of the charging cable according to any one of the embodiments above.

(III) Beneficial Effects

Compared with the prior art, the above technical solution according to some embodiments of the present disclosure has the following advantages.

The first charge pump circuit module and the second charge pump circuit module are arranged in the dual-cell battery power supply adjusting circuit according to some embodiments of the present disclosure. During the trickle charging phase, the constant-voltage charging phase, and, the charging cut-off phase, because the current is small and heat generation is low, the Buck circuit module is used to reduce the voltage first, on one hand, power is supplied to the system power supply module, and on the other hand, the voltage is boosted by the second charge pump circuit module to charge the dual-cell battery. During the constant-current charging phase, the first charge pump circuit module is used to control the charging current, thus making the output current of the first charge pump circuit module greater than the input current, so that the current transmitted on the charging cable can be reduced when large current charging is realized, and because the charging cable has certain impedance, based on a power calculation formula I²R, the power corresponds to the heat generation; and when the current is reduced, the heat generation is also reduced, which can reduce the heat generation on the charging cable, and similarly, the heat generation on a charging chip and a PCB can be reduced, that is, the heat generation on the whole charging circuit can be reduced, thus ensuring high charging efficiency.

It should be understood that the above general description and the following detailed description are exemplary and explanatory only and cannot limit the present disclosure.

BRIEF DESCRIPTION OF THE DRAWINGS

The drawings herein are incorporated into the specification and constitute a part of the specification, show the embodiments that conform to the present disclosure, and are used for explaining the principle of the present disclosure together with the specification.

In order to illustrate the embodiments of the present disclosure or the technical solutions in the prior art more clearly, the drawings needed to be used in the description of the embodiments or the prior art will be briefly introduced hereinafter. Obviously, for those of ordinary skills in the art, other drawings may also be obtained according to these drawings without going through creative operates.

FIG. 16 is a state diagram of the second charge pump circuit module shown in FIG. 12 when the cell is in the discharging phase and the charge pump is in the discharging phase; and FIG. 17 is a flow chart of a battery power supply adjusting method according to some embodiments of the present disclosure.

Figure 1:
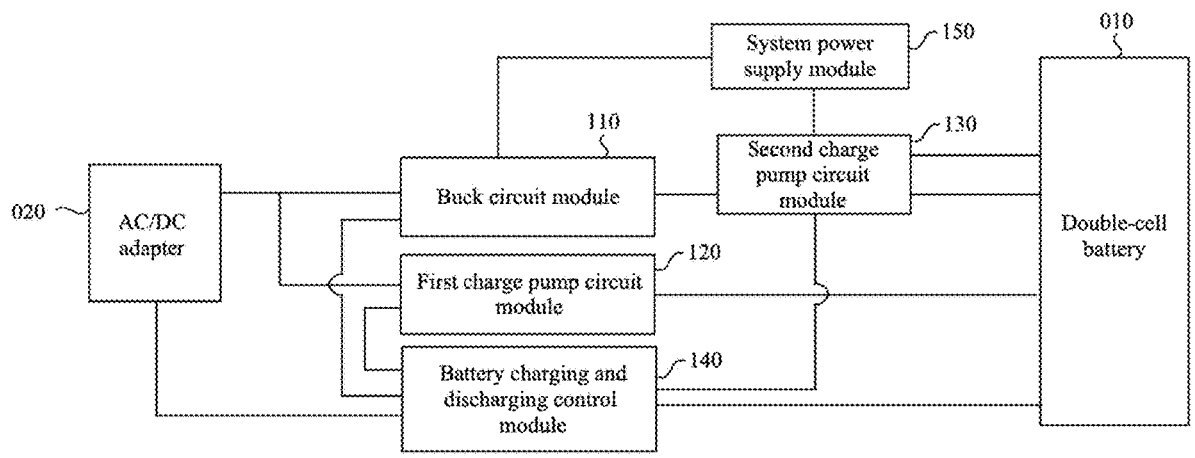
FIG. 1 is a schematic structural diagram of a battery power supply adjusting circuit provided by an embodiment of the present disclosure.

In the drawings, 010 refers to a double-cell battery, 020 refers to an AC/DC adapter; 110 refers to a Buck circuit module, 120 refers to a first charge pump circuit module; 125 refers to a charge pump circuit submodule; 130 refers to a second charge pump circuit module; 140 refers to a battery charging and discharging control module; 150 refers to a system power supply module; 201 refers to a Buck controller; 202 refers to an input capacitor; 203 refers to an output capacitor; 204 refers to an output inductance; 205 refers to a charging voltage and current controller; C1 refers to a first capacitor; C2 refers to a second capacitor; C3 refers to a third capacitor; C4 refers to a fourth capacitor; C5 refers to a fifth capacitor; C6 refers to a sixth capacitor; C7 refers to a seventh capacitor; C8 refers to a eighth capacitor; C9 refers to a ninth capacitor; C10 refers to a tenth capacitor; Q1 refers to a first transistor; Q2 refers to a second transistor; Q3 refers to a third transistor; Q4 refers to a fourth transistor; Q5 refers to a fifth transistor; Q6 refers to a sixth transistor; Q7 refers to a seventh transistor; Q8 refers to an eighth transistor; Q9 refers to a ninth transistor; Q10 refers to a tenth transistor; Q11 refers to an eleventh transistor; Q12 refers to a twelfth transistor; Q13 refers to a thirteenth transistor; Q14 refers to a fourteenth transistor; Q15 refers to a fifteenth transistor; Q16 refers to a sixteenth transistor; Q17 refers to a seventeenth transistor; Q18 refers to an eighteenth transistor; and Q19 refers to a nineteenth transistor.

DETAILED DESCRIPTION OF THE EMBODIMENTS

In order to make objects, technical solutions, and advantages of embodiments of the present disclosure more clearly, a technical solution in the embodiments of the present disclosure will be described clearly and completely hereinafter. Obviously, the described embodiments are some, but not all, embodiments of the present disclosure. Based on the embodiments in the present disclosure, all other embodiments obtained by those of ordinary skills in the art without going through creative operations fall within the scope of protection of the present disclosure.

A first charge pump circuit module and a second charge pump circuit module are arranged in a dual-cell battery power supply adjusting circuit provided by an embodiment of the present disclosure. During a trickle charging phase, a constant-voltage charging phase, and a charging cut-off phase, because the current is small and heat generation is low, a Buck circuit module is used to reduce a voltage first, on one hand, power is supplied to a system power supply module, and on the other hand, the voltage is boosted by the second charge pump circuit module to charge a dual-cell battery. In a constant-current charging phase, the first charge pump circuit module may be used to control, so that the charging efficiency is high and heat generation is reduced during large current charging. Optionally, the first charge pump circuit module may comprise a ½ buck charge pump (with an input voltage being twice an output voltage and an input current being half of an output current), may also comprise a ⅓ buck charge pump (with an input voltage being three times an output voltage and an input current being one third of an output current), or may be other types of buck charge pumps, which is not limited herein, and will be illustrated hereinafter.

During discharging, a voltage can be reduced by the second charge pump circuit module, and the dual-cell battery is used to supply power to the system power supply module.

With reference to FIG. 1 through FIG. 17, a dual-cell battery charging circuit and method, a charging cable, and a terminal device according to some embodiments of the present disclosure will be illustrated hereinafter.

FIG. 1 is a schematic structural diagram of the battery power supply adjusting circuit according to some embodiments of the present disclosure. With reference to FIG. 1, the battery power supply adjusting circuit is configured to charge a double-cell battery 010, and the battery power supply adjusting circuit may comprise a Buck circuit module 110, a first charge pump circuit module 120, a second charge pump circuit module 130, a battery charging and discharging control module 140, and a system power supply module 150. An input of the Buck circuit module 110 and an input of the first charge pump circuit module 120 are externally connected to an AC/DC adapter 020 respectively. A first output of the Buck circuit module 110 is connected to the second charge pump circuit module 130. A second output of the Buck circuit module 110 is connected to the system power supply module 150. The battery charging and discharging control module 140 is connected to a controlled end of the Buck circuit module 110. A controlled end of the first charge pump circuit module (120), a controlled end of the second charge pump circuit module 010 and the double-cell battery 010, the first charge pump circuit module 120 and the second charge pump circuit module 130 are respectively connected to the dual-cell battery 010, and the second charge pump circuit module 130 is further connected to the system power supply module 150. The battery charging and discharging control module 140 is a control module for controlling the Buck circuit module 110, the first charge pump circuit module 120, and the second charge pump circuit module 130 to operate in corresponding charging and discharging phases. The Buck circuit module 110 operates in a trickle charging phase, a constant-voltage charging phase, and a charging cut-off phase. On one hand, the Buck circuit module is configured to supply power to the system power supply module 150, and on the other hand, the Buck circuit module charges the dual-cell battery 010 after being boosted by the second charge pump circuit module 130. The first charge pump circuit module 120 operates in a constant-current charging phase, and is a circuit module for making an output current of the first charge pump circuit module 120 smaller than an input current, and making an output voltage of the charge pump circuit module smaller than an input voltage. The second charge pump circuit module 130 operates during discharging, and is a circuit module for converting a discharging voltage of the dual-cell battery 010 into a voltage suitable for the system power supply module 150. The "dual-cell battery" may also be referred to as "battery" for short hereinafter.

In the embodiment of the present disclosure, the charging phase of the battery may comprise the trickle charging phase, the constant-current charging phase, the constant-voltage charging phase, and the charging cut-off phase. The trickle charging phase may be understood as a "pre-charging phase", which is a small current charging phase. The constant-current charging phase is a phase of charging with a constant current value, and during this phase, the charging voltage is gradually increased. The constant-voltage charging phase is a phase for charging with a constant voltage value, and during this phase, the charging current is gradually decreased. During the charging cut-off phase, the charging current is gradually decreased, and the charging current decreases to a certain degree corresponding to a fully charged state of the battery. Illustratively, the charging current serves as an indication to a user that the battery is fully charged at this time.

Illustratively, in the charging phase, various circuit modules may cooperate to operate in various phases as follows.

In the trickle charging phase, when the voltage of the battery is lower than 6 V or a certain voltage value of about 6 V, a maximum constant current of 0.1 C may be used to charge the battery.

Illustratively, the battery charging and discharging control module 140 may determine a port type of a power supply adapter (that is, the AC/DC adapter 020). The port type may include, for example, a Standard Downstream Port (SDP), a Dedicated Charging Port (DCP), a Charging Downstream Port (CDP) or any other ports known to those skilled in the art.

When the port type of the AC/DC adapter 020 is the Standard Downstream Port (SDP), the port is a pluggable USB interface in a computer, with a through-flow current of 500 mA and a voltage of 5 V. When the port type of the AC/DC adapter 020 is the Charging Downstream Port (CDP), the port is similar to a hub, and may be a hub with multiple interfaces, with a through-flow current of 1 A to 1.5 A and a voltage of 5 V. In the above two cases, an output voltage of the AC/DC adapter 020 is also 5 V. The battery charging and discharging control module 140 controls to turn on the Buck circuit module 110 and the second charge pump circuit module 130 and turn off the first charge pump circuit module 120. Therefore, the voltage is reduced by the Buck circuit module first, and on one hand, the Buck circuit module is configured to supply power to the system power supply module 150. On the other hand, the Buck circuit module charges the dual-cell battery 010 after being boosted by the second charge pump circuit module 130.

When the port type of the AC/DC adapter 020 is the Dedicated Charging Port (DCP), the battery charging and discharging control module 140 will not carry out a boost control protocol with the AC/DC adapter 020, and the output voltage of the AC/DC adapter 020 is also 5 V. The battery charging and discharging control module 140 controls to turn on the Buck circuit module and the second charge pump circuit module 130, and turn off the first charge pump circuit module 120. Therefore, the voltage is reduced by the Buck circuit module first. On one hand, the Buck circuit module is configured to supply power to the system power supply module 150. On the other hand, the Buck circuit module charges the dual-cell battery 010 after being boosted by the second charge pump circuit module 130.

In the constant-current charging phase, when the charging voltage is greater than a set voltage threshold and the charging current is greater than a set current threshold (such as 1 A or 2 A), the battery charging and discharging control module 140 controls to turn on the first charge pump circuit module 120, and the battery charging and discharging control module 140 will also carry out the boost control protocol with the AC/DC adapter 020 to control the AC/DC adapter 020 to output a dynamic voltage and a dynamic current to the first charge pump circuit module 120. At this time, the first charge pump circuit module 120 may carry out large current charging, and an operating principle and an operating process of the first charge pump circuit module 120 will be illustrated hereinafter with reference to the drawings. At this time, the Buck circuit module 110 is also continuously controlled to be turned on to supply power to the system power supply module 150. Alternatively, the second charge pump circuit module 130 is controlled to be turned on to distribute a part of the charging current. It can be understood that, because the Buck circuit module 110 has poor efficiency and high heat generation, the Buck circuit module 110 cannot distribute a large charging current, which determines that the second charge pump circuit module 130 can only distribute a part of the charging current.

During the constant-voltage charging phase and the charging cut-off phase, the charging current is smaller than the set current threshold, the battery charging and discharging control module 140 does not need to carry out the boost control protocol with the AC/DC adapter 020, and the AC/DC adapter 020 is controlled to output a voltage value lower than the voltage of the battery, such as 5 V or 6 V. At this time, the battery charging and discharging control module 140 controls to turn on the Buck circuit module 110 and the second charge pump circuit module 130 and turn off the first charge pump circuit module 120. Therefore, the voltage is reduced by the Buck circuit module first, and on one hand, the Buck circuit module is configured to supply power to the system power supply module 150. On the other hand, the Buck circuit module charges the dual-cell battery 010 after being boosted by the second charge pump circuit module 130.

In the above charging process, the voltage threshold and the current threshold may be set based on a charging requirement of the dual-cell battery, which will not be limited herein.

In the discharging phase, the battery charging and discharging control module 140 controls to turn on the second charge pump circuit module 130, and connect the dual-cell battery 010 and the system power supply module 150 through the second charge pump circuit module 130. Therefore, the second charge pump circuit module 130 is used to reduce the voltage and supply power to the system power supply module 150.

The system power supply module 160 is mainly used to provide relevant power supply to the system, thus ensuring the normal operation of the system.

In the above charging process, specifically, during the trickle charging phase, the constant-voltage charging phase, and the charging cut-off phase, the voltage is boosted by the second charge pump circuit module 130 to charge the dual-cell battery 010. In the discharging phase, because the power supply to the system does not need too high voltage, the second charge pump circuit module 130 can reduce the output voltage of the dual-cell battery 010 to supply power to the system power supply module 150.

The first charge pump circuit module 120 and the second charge pump circuit module 130 are arranged in the dual-cell battery power supply adjusting circuit according to some embodiments of the present disclosure. During the trickle charging phase, the constant-voltage charging phase, and the charging cut-off phase, because the current is small and heat generation is low, the Buck circuit module 110 is used to reduce the voltage first. On one hand, power is supplied to the system power supply module 150. On the other hand, the voltage is boosted by the second charge pump circuit module 130 to charge the dual-cell battery 010. In the constant-current charging phase, the first charge pump circuit module 120 is used to control the charging current, thus making the output current of the first charge pump circuit module greater than the input current, so that the current transmitted on the charging cable can be reduced when large current charging is realized, and because the charging cable has certain impedance, based on a power calculation formula $I^2R$. The power corresponds to the heat generation; and when the current is reduced. The heat generation is also reduced, which can reduce the heat generation on the charging cable, and similarly, the heat generation on a charging chip and a PCB can be reduced; that is, the heat generation on the whole charging circuit can be reduced, thus ensuring high charging efficiency.

Referring to FIG. 2 through FIG. 16, specific compositions and operating principles of various circuit modules will be illustrated hereinafter.

Figure 2:
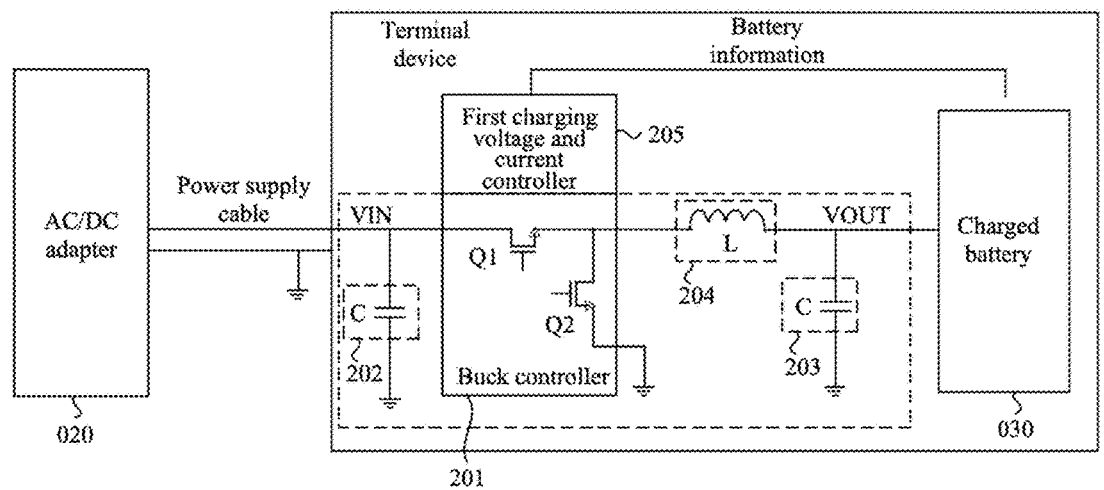
FIG. 2 is a schematic structural diagram of a connection relationship of a Buck circuit module according to some embodiments of the present disclosure in the battery power supply adjusting circuit.

In some embodiments, FIG. 2 is a schematic structural diagram of a connection relationship of the Buck circuit module according to some embodiments of the present disclosure in the battery power supply adjusting circuit, which shows a specific structure of the Buck circuit module. Based on FIG. 1, with reference to FIG. 2, the Buck circuit module 110 comprises a Buck controller 201, an input capacitor 202, an output capacitor 203, an output inductance 204, and a charging voltage and current controller 205. The Buck controller 201 comprises a first transistor Q1 and a second transistor Q2. Battery information of a battery being charged 030 is transmitted to the charging voltage and current controller 205. The first transistor Q1 and the output inductance 204 are connected in series between the AC/DC adapter 020 and the battery being charged 030. The input capacitor 202 is connected in series between an input of the first transistor Q1 and the ground. The output capacitor 203 is connected in series between an output of the output inductance 204 and the ground. One end of the second transistor Q2 is connected between the first transistor Q1 and the output inductance 204, and the other end of the second transistor is grounded. During charging of the output inductance 204, the first transistor Q1 is turned on and the second transistor Q2 is turned off. During the discharging of the output inductance 204, the first transistor Q1 is turned off and the second transistor Q2 is turned on.

The Buck circuit module 110 may include a Buck topological structure, which is also called a Buck voltage reduction circuit or a Buck circuit. The Buck circuit mainly includes the Buck controller 201, the input capacitor 202, the output capacitor 203, and the output inductance 204; that is, the input capacitor 202, the output capacitor 203, the output inductance 204 and the Buck controller 201 constitute the Buck circuit. The charging voltage and current controller 205 is configured to control a voltage and a current which change in a zigzag manner with time. The Buck circuit is a main loop of power supply conversion in the whole battery power supply adjusting circuit, so that the charging current, the charging efficiency and the heat generation are all determined by circuit components in the Buck circuit.

A basic operating principle of the Buck circuit comprises two phases as follows.

Figure 3:
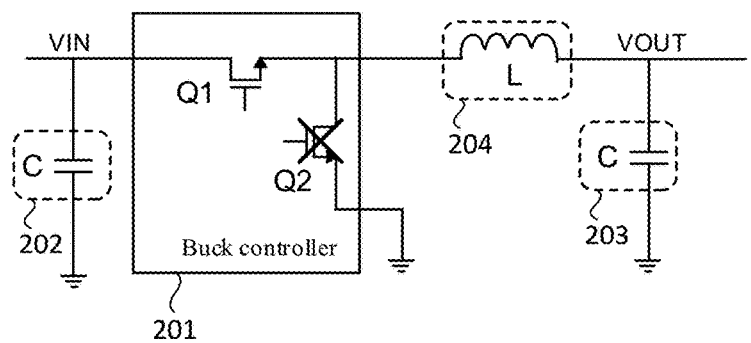
FIG. 3 is a state diagram of an inductor during charging in the Buck circuit module according to some embodiments of the present disclosure.

During phase 1, namely the charging phase of the output inductance 204, with reference to FIG. 3, the first transistor Q1 is turned on and the second transistor Q2 is turned off, and the output inductance 204 is charged. The first transistor Q1, the output inductance 204, and the battery being charged 030 form the main loop, and the main current of the circuit may flow through the first transistor Q1, the output inductance 204 and the battery being charged 030.

Figure 4:
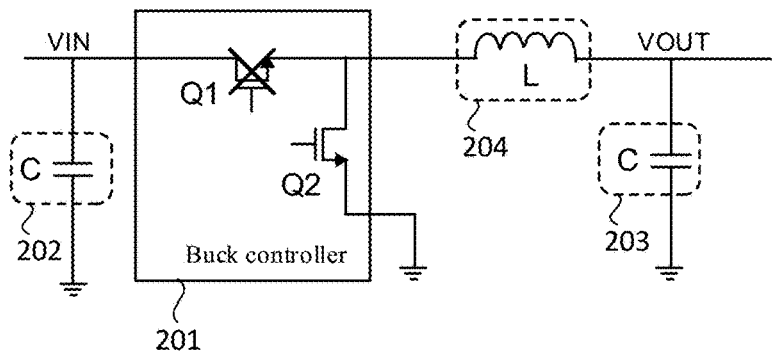
FIG. 4 is a state diagram of the inductor during discharging in the Buck circuit module according to some embodiments of the present disclosure.

During phase 2, namely the discharging phase of the output inductance 204, with reference to FIG. 4, the first transistor Q1 is turned off and the second transistor Q2 is turned on, and the output inductance 204 is discharged. The second transistor Q2, the output inductance 204, and the battery being charged 030 form the main loop, and the main current of the circuit may flow through the second transistor Q2, the output inductance 204 and the battery being charged 030.

In the above operating principle, the battery being charged 030 may be a battery in the system power supply module 150 or a battery in the dual-cell battery 010. If the battery being charged is the battery in the dual-cell battery, the main loop formed above further comprises the second charge pump circuit module 130 connected between the battery being charged 030 and the output inductance 204.

In the Buck circuit, the first transistor Q1 and the second transistor Q2 may have a conduction loss and a switching loss, and the output inductance 204 may have a coil loss and a core loss, so that the whole Buck circuit cannot achieve very high efficiency. At present, the conversion efficiency in the voltage reduction circuit applying the Buck circuit is below 91%. However, energy lost by main power devices, comprising the first transistor Q1, the second transistor Q2, and the output inductance 204, is basically converted into heat energy, so that there is high heat generation when the Buck circuit is used in the charging process, leading to the case that the whole Buck circuit cannot achieve very large charging current.

Accordingly, in the battery power supply adjusting circuit according to some embodiments of the present disclosure, the Buck circuit may be suitable for converting a voltage at the input into a voltage suitable for the system power supply module 150, and charging the dual-cell battery 010 in combination with the second charge pump circuit module 130 in a small current charging phase, so as to be beneficial for avoiding excessive heat generation in a large current charging process, thus avoiding affecting the charging efficiency.

Figure 5:
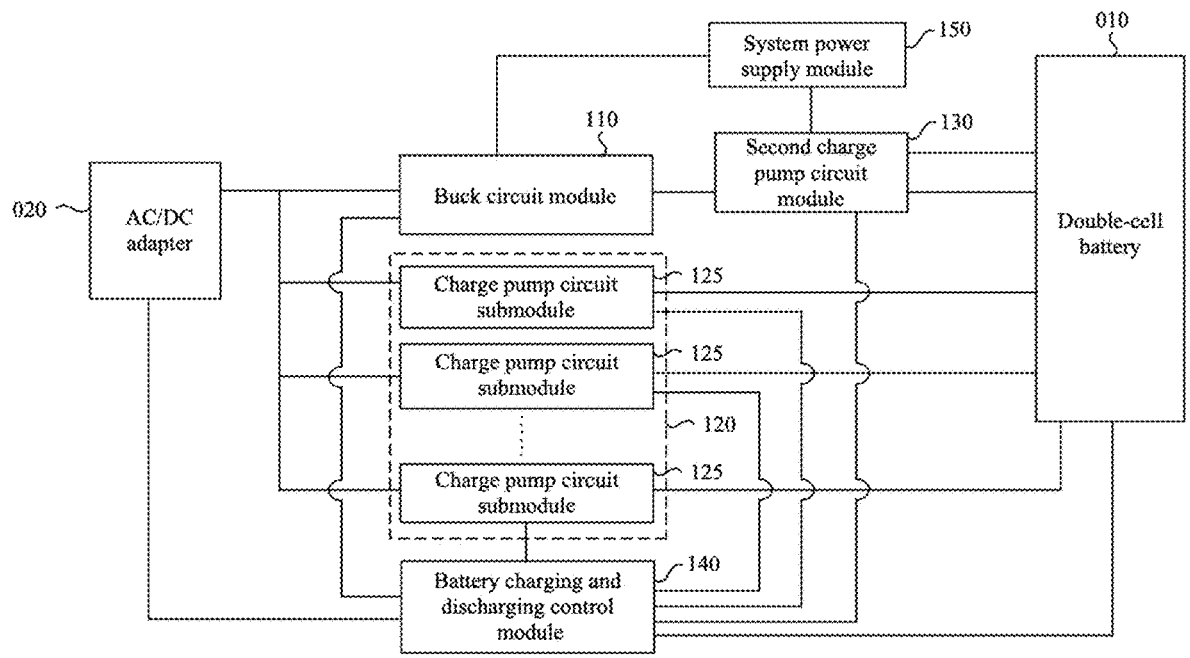
FIG. 5 is a schematic structural diagram of another battery power supply adjusting circuit according to some embodiments of the present disclosure.

In some embodiments, FIG. 5 is a schematic structural diagram of another battery power supply adjusting circuit according to some embodiments of the present disclosure, in which the first charge pump circuit module is detailed based on FIG. 1. With reference to FIG. 5, the first charge pump circuit module 120 comprises N charge pump circuit submodules 125 arranged in parallel; N≥1 and N is an integer; and controlled ends of the N charge pump circuit submodules 125 are respectively connected to the battery charging and discharging control module 140.

At the same charging voltage, the greater the charging current, the higher the charging power, but the higher the heat generation. In order to reduce heat generation as much as possible while ensuring large charging power, that is to balance the charging power and the heat generation, a suitable charging current range of a single charge pump circuit submodule 125 may be 4 A to 6 A.

On this basis, a plurality of charge pump circuit submodules 125 are arranged in parallel, to constitute the first charge pump circuit module 120 suitable for the large charging current. That is, in practical applications, a quantity of parallel charge pump circuit submodules 125 may be selected according to the charging current, and the larger the charging current, the greater the quantity of the charge pump circuit submodules 125, so that the power supply conversion efficiency of the whole charging scheme can be improved and the heat generation can be reduced.

Illustratively, when the charging current is 8 A to 10 A, two charge pump circuit submodules 125 are arranged in parallel in the first charge pump circuit module 120, and each charge pump circuit submodule 125 shares the charging current of 4 A to 5 A. When the charging current is 20 A, four charge pump circuit submodules 125 are arranged in parallel in the first charge pump circuit module 120, and each charge pump circuit submodule 125 shares the charging current of 5 A.

It can be understood that there may also be one charge pump circuit submodule 125 in the first charge pump circuit module 120.

In other embodiments, when the charging current is at other current values or within other current ranges, the quantity of the charge pump circuit submodules 125 in the first charge pump circuit module 120 may change accordingly, which will not be limited herein.

In the above embodiment, the charge pump circuit submodule may be a ½ buck charge pump, which will be illustrated hereinafter referring to FIGS. 6-8; and may also be a ⅓ buck charge pump, which will be illustrated hereinafter referring to FIGS. 9-11.

Figure 6:
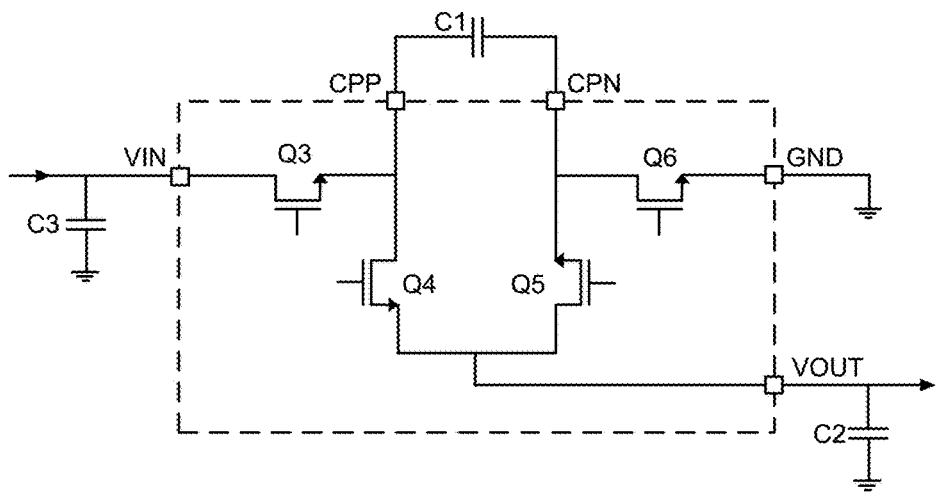
FIG. 6 is a schematic structural diagram of a first charge pump circuit module according to some embodiments of the present disclosure.

In some embodiments, FIG. 6 is a schematic structural diagram of the charge pump circuit submodule according to some embodiments of the present disclosure. According to FIG. 1, with reference to FIG. 6, the charge pump circuit submodule 125 includes a first capacitor C1, a second capacitor C2, a third capacitor C3, a third transistor Q3, a fourth transistor Q4, a fifth transistor Q5, and a sixth transistor Q6. An input of the third transistor Q3 and one end of the third capacitor C3 are connected to the AC/DC adapter 020. The other end of the third capacitor C3 is grounded, an output of the third transistor Q3 and an input of the fourth transistor Q4 are both connected to a first end of the first capacitor C1. The other end of the first capacitor C1 is connected to an input of the sixth transistor Q6 and an output of the fifth transistor Q5, an output of the sixth transistor Q6 is grounded. An output of the fourth transistor Q4, an input of the fifth transistor Q5, and one end of the second capacitor C2 are all connected to the double-cell battery 010. The other end of the second capacitor C2 is grounded. During a series connection phase of the capacitors, the third transistor Q3 and the fifth transistor Q5 are turned on, and the fourth transistor Q4 and the sixth transistor Q6 are turned off. During a parallel connection phase of the capacitors, the fourth transistor Q4 and the sixth transistor Q6 are turned on, and the third transistor Q3 and the fifth transistor Q5 are turned off.

In the embodiment of the present disclosure, because a circuit structure of the charge pump circuit submodule 125 does not need an inductance device, the voltage is reduced only by switching between the capacitors turned on, so that there is no energy loss caused by the inductor, thus making the conversion efficiency of the whole circuit structure high. Because the conversion efficiency of the whole circuit structure is higher, there are low noise levels (that is, input noise and output noise, which corresponds to fluctuations caused by inductive switching, and is related to internal switching control), small fluctuations of an electrical signal, and small electromagnetic interference (EMI).

The charge pump circuit submodule 125 in the embodiment of the present disclosure is the ½ buck charge pump, with an input voltage being twice an output voltage and an input current being half of an output current. The ½ buck charge pump comprises four transistors and three capacitors. The capacitors are connected in series and in parallel by controlling the transistors to be turned on and off, so as to reduce the voltage, which will be illustrated hereinafter with reference to FIG. 7 and FIG. 8.

A basic operating principle of the ½ buck charge pump comprises two phases as follows.

Figure 7:
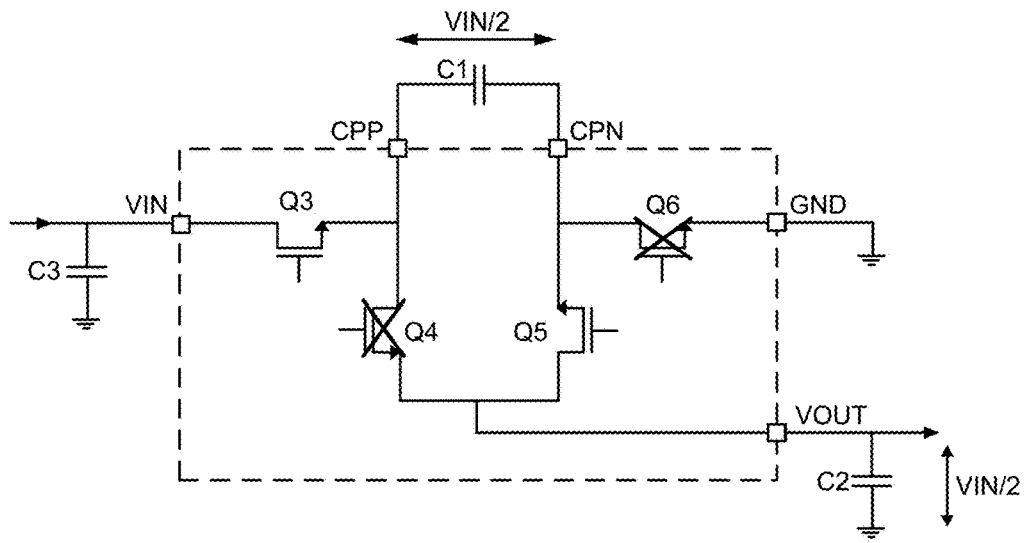
FIG. 7 is a state diagram of the first charge pump circuit module shown in FIG. 6 in a series connection phase of capacitors.

During phase 1, namely the series connection phase of the capacitors, or called a capacitor charging phase, as shown in FIG. 7, only the third transistor Q3 and the fifth transistor Q5 are turned on, the first capacitor C1 and the second capacitor C2 are connected in series, and the two capacitors are both charged at a charging voltage approximately equal to half of an input voltage, that is, VIN/2.

Figure 8:
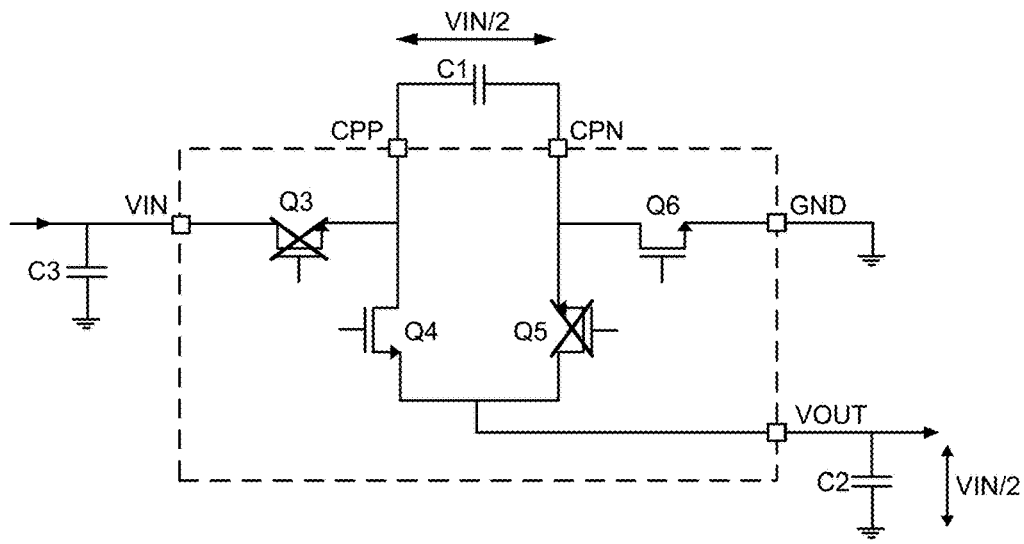
FIG. 8 is a state diagram of the first charge pump circuit module shown in FIG. 6 in a parallel connection phase of the capacitors.

During phase 2, namely the parallel connection phase of the capacitors, or called a capacitor discharging phase, as shown in FIG. 8, only the fourth transistor Q4 and the sixth transistor Q6 are turned on, the first capacitor C1 and the second capacitor C2 are connected in parallel, and the two capacitors are both discharged, wherein an output voltage VOUT is equal to a discharging voltage of two ends of the second capacitor C2, and is also equal to the charging voltage in the phase 1, that is, VIN/2.

Therefore, the voltage is reduced.

Referring to FIGS. 6-8, a circuit structure and an operating principle of the ½ buck charge pump are illustrated hereinafter. Referring to FIGS. 9-11, a circuit structure and an operating principle of the ⅓ buck charge pump are illustrated hereinafter.

Figure 9:
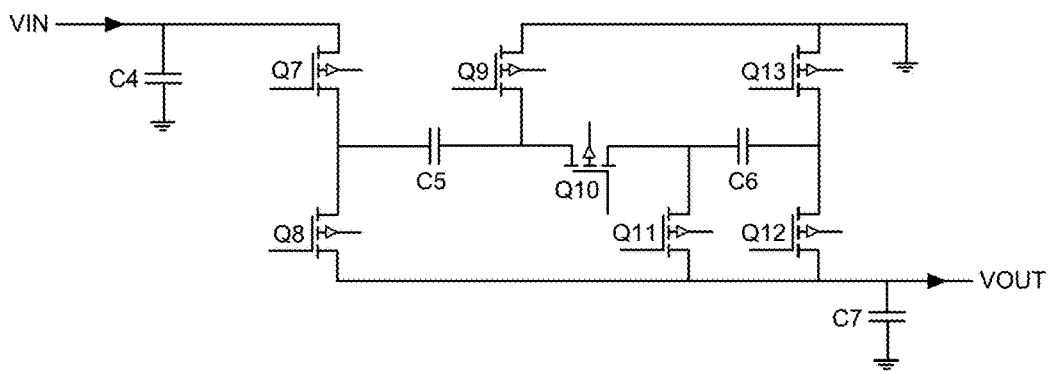
FIG. 9 is a schematic structural diagram of another first charge pump circuit module according to some embodiments of the present disclosure.

In some embodiments, FIG. 9 is a schematic structural diagram of another charge pump circuit submodule according to some embodiments of the present disclosure. With reference to FIG. 9, the charge pump circuit submodule 125 includes a fourth capacitor C4, a fifth capacitor C5, a sixth capacitor C6, a seventh capacitor C7, a seventh transistor Q7, an eighth transistor Q8, a ninth transistor Q9, a tenth transistor Q10, an eleventh transistor Q11, a twelfth transistor Q12, and a thirteenth transistor Q13. One end of the fourth capacitor C4 and an input of the seventh transistor Q7 are both connected to the AC/DC adapter 020. The other end of the fourth capacitor C4 is grounded. An output of the seventh transistor Q7 and an input of the eighth transistor Q8 are both connected to one end of the fifth capacitor C5. The other end of the fifth capacitor C5 is connected to an input of the ninth transistor Q9 and an input of the tenth transistor Q10. An output of the ninth transistor Q9 and an output of the thirteenth transistor Q13 are both grounded. An input of the thirteenth transistor Q13 and an output of the twelfth transistor Q12 are both connected to one end of the sixth capacitor C6. The other end of the sixth capacitor C6 is connected to an output of the tenth transistor Q10 and an output of the eleventh transistor Q11. An output of the eighth transistor Q8, an input of the eleventh transistor Q11, an input of the twelfth transistor Q12, and one end of the seventh capacitor C7 are all connected to the double-cell battery 010, and the other end of the seventh capacitor C7 is grounded. During a series connection phase of the capacitors, the seventh transistor Q7, the tenth transistor Q10 and the twelfth transistor Q12 are turned on, and the eighth transistor Q8, the ninth transistor Q9, the eleventh transistor Q11 and the thirteenth transistor Q13 are turned off. In a parallel connection phase of the capacitors, the eighth transistor Q8, the ninth transistor Q9, the eleventh transistor Q11, and the thirteenth transistor Q13 are turned on, and the seventh transistor Q7, the tenth transistor Q10, and the twelfth transistor Q12 are turned off.

In the embodiment of the present disclosure, because a circuit structure of the charge pump circuit submodule 125 does not need an inductance device, the voltage is reduced only by switching between the capacitors turned on, so that there is no energy loss caused by the inductor, thus making the conversion efficiency of the whole circuit structure high. Because the conversion efficiency of the whole circuit structure is higher, there are low noise levels (that is, input noise and output noise, which corresponds to fluctuations caused by inductive switching and is related to internal switching control), small fluctuations of an electrical signal, and small electromagnetic interference (EMI).

The charge pump circuit submodule 125 in the embodiment of the present disclosure is the ⅓ buck charge pump, with an input voltage being three times an output voltage and an input current being one third of an output current. The ⅓ buck charge pump comprises seven transistors and four capacitors. The capacitors are connected in series and in parallel by controlling the transistors to be turned on and off, so as to reduce the voltage, which will be illustrated hereinafter with reference to FIG. 10 and FIG. 11.

A circuit operating principle of the ⅓ buck charge pump includes two phases as follows.

Figure 10:
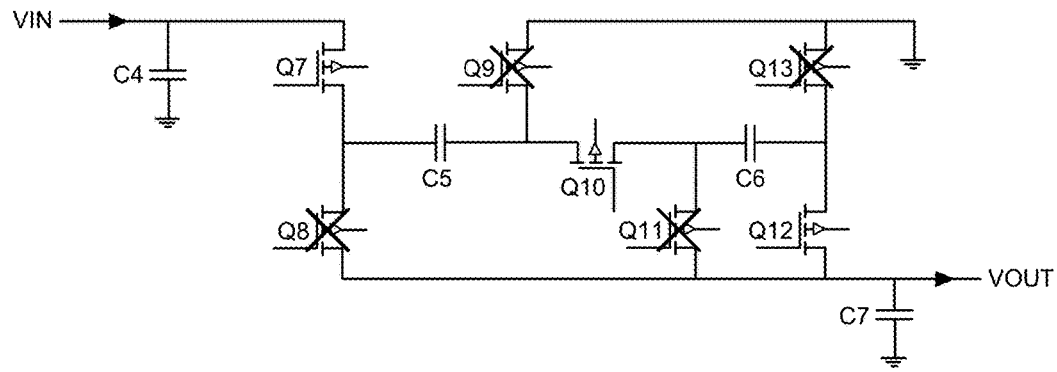
FIG. 10 is a state diagram of the first charge pump circuit module shown in FIG. 9 in the series connection phase of the capacitors.

During phase 1, namely the series connection phase of the capacitors, or called the capacitor charging phase, as shown in FIG. 10, the seventh transistor Q7, the tenth transistor Q10, and the twelfth transistor Q12 are all connected (i.e., turned on) and other transistors are disconnected (i.e., turned off). Meanwhile, the fifth capacitor C5, the sixth capacitor C6, and the seventh capacitor C7 are connected in series, and the three capacitors are all charged at a charging voltage approximately equal to one third of an input voltage, that is, ⅓VIN.

Figure 11:
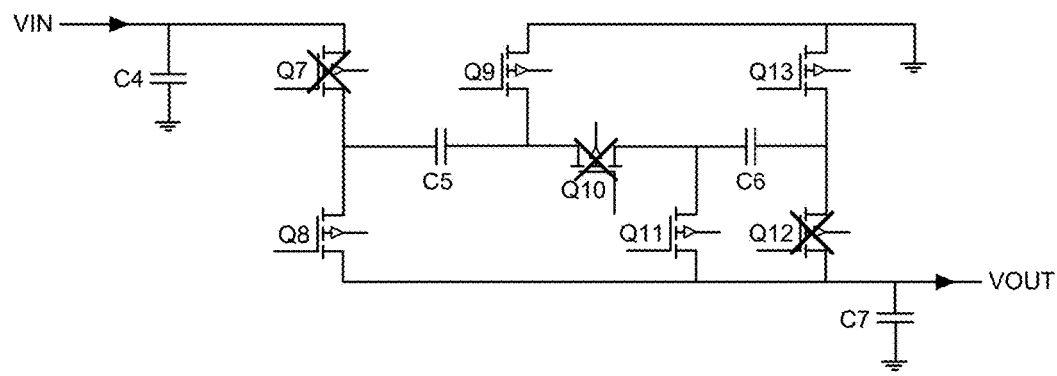
FIG. 11 is a state diagram of the first charge pump circuit module shown in FIG. 9 in the parallel connection phase of the capacitors.

During phase 2, namely the parallel connection phase of the capacitors, or called the capacitor discharging phase, as shown in FIG. 11, the eighth transistor Q8, the ninth transistor Q9, the eleventh transistor Q11, and the thirteenth transistor Q13 are all connected (i.e., turned on) and other transistors are disconnected (i.e., turned off). Meanwhile, the fifth capacitor C5, the sixth capacitor C6 and the seventh capacitor C7 are connected in parallel, and the three capacitors are all discharged, wherein an output voltage VOUT is equal to a discharging voltage of two ends of the seventh capacitor C7, and is also equal to the charging voltage in the phase 1, that is, ⅓VIN. Therefore, the voltage is reduced.

It can be understood that, because the input current of the ⅓ buck charge pump is one third of the output current and the input current of the ½ buck charge pump is half of the output current, the input current corresponding to the ⅓ buck charge pump is further reduced by ⅓ compared with the input current of the ½ buck charge pump at the same output current, so as to greatly reduce the heat generation on the charging cable, the heat generation on the charging chip and the heat generation on the PCB, and ensuring high charging efficiency. In addition, the output current of the ⅓ buck charge pump may be larger than that of the ½ buck charge pump at the same input current, that is, a larger charging current may be achieved, thus improving charging efficiency and shortening charging time.

Referring to FIGS. 6-8, the circuit structure and the operating principle of the ½ buck charge pump are illustrated above. Referring to FIGS. 9-11, the circuit structure and the operating principle of the ⅓ buck charge pump are illustrated above. In other embodiments, the charge pump circuit submodule may also be a buck charge pump of other multiples, which will not be limited herein.

With reference to FIG. 12 to FIG. 16, the second charge pump circuit module is illustrated hereinafter.

Figure 12:
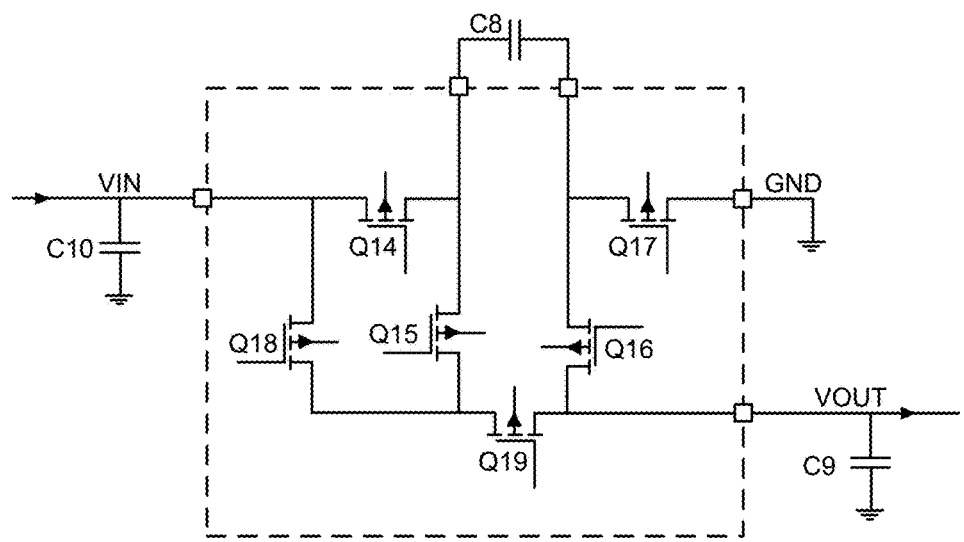
FIG. 12 is a schematic structural diagram of a second charge pump circuit module according to some embodiments of the present disclosure.

In some embodiments, FIG. 12 is a schematic structural diagram of the second charge pump circuit module according to some embodiments of the present disclosure. According to FIG. 1, with reference to FIG. 12, the second charge pump circuit module 130 includes an eighth capacitor C8, a ninth capacitor C9, a tenth capacitor C10, a fourteenth transistor Q14, a fifteenth transistor Q15, a sixteenth transistor Q16, a seventeenth transistor Q17, an eighteenth transistor Q18, and a nineteenth transistor Q19. One end of the eighth capacitor C8 is connected to an output of the fourteenth transistor Q14 and an input of the fifteenth transistor Q15. The other end of the eighth capacitor C8 is connected to an output of the sixteenth transistor Q16 and an input of the seventeenth transistor Q17. An output of the seventeenth transistor Q17 is grounded. An input of the fourteenth transistor Q14, an input of the eighteenth transistor Q18, and one end of the tenth capacitor C10 are all connected to the AC/DC adapter 020. The other end of the tenth capacitor C10 is grounded. An output of the eighteenth transistor Q18 and an output of the fifteenth transistor Q15 are both connected to an input of the nineteenth transistor Q19. An input of the sixteenth transistor Q16, an output of the nineteenth transistor Q19, and one end of the ninth capacitor C9 are all connected to the double-cell battery 010.

The other end of the ninth capacitor C9 is grounded. During the charging of the dual-cell battery 010, the operation phase of the second charge pump circuit module 130 includes a first charging phase and a first discharging phase. During the first charging phase, the fourteenth transistor Q14 and the seventeenth transistor Q17 are turned on, and the fifteenth transistor Q15, the sixteenth transistor Q16, the eighteenth transistor Q18 and the nineteenth transistor Q19 are turned off. During the first discharging phase, the fifteenth transistor Q15, the sixteenth transistor Q16, and the eighteenth transistor Q18 are turned on, and the fourteenth transistor Q14, the seventeenth transistor Q17, and the nineteenth transistor Q19 are turned off. During the discharging of the dual-cell battery 010, the operation phase of the second charge pump circuit module 130 includes a second charging phase and a second discharging phase. During the second charging phase, the fourteenth transistor Q14 and the sixteenth transistor Q16 are turned on, and the fifteenth transistor Q15, the seventeenth transistor Q17, the eighteenth transistor Q18 and the nineteenth transistor Q19 are turned off. During the second discharging phase, the fifteenth transistor Q15, the seventeenth transistor Q17 and the nineteenth transistor Q19 are turned on, and the fourteenth transistor Q14, the sixteenth transistor Q16 and the eighteenth transistor Q18 are turned off.

In the battery power supply adjusting circuit according to some embodiments of the present disclosure, the voltage is boosted inside the second charge pump circuit module 130 during the trickle charging phase, the constant-voltage charging phase, and the charging cut-off phase in the charging process, and the output voltage of the Buck circuit module 110 is converted into a voltage suitable for charging the dual-cell battery 010. In addition, the voltage is reduced inside the second charge pump circuit module during the discharging phase, and the output voltage of the dual-cell battery 010 is converted into a voltage suitable for supplying power to the system power supply module 150.

In the embodiment of the present disclosure, the second charge pump circuit module 130 is composed of six transistors and three capacitors. The capacitors are charged and discharged by controlling the transistors to be turned on and turned off, thus reducing the voltage and boosting the voltage.

Figure 13:
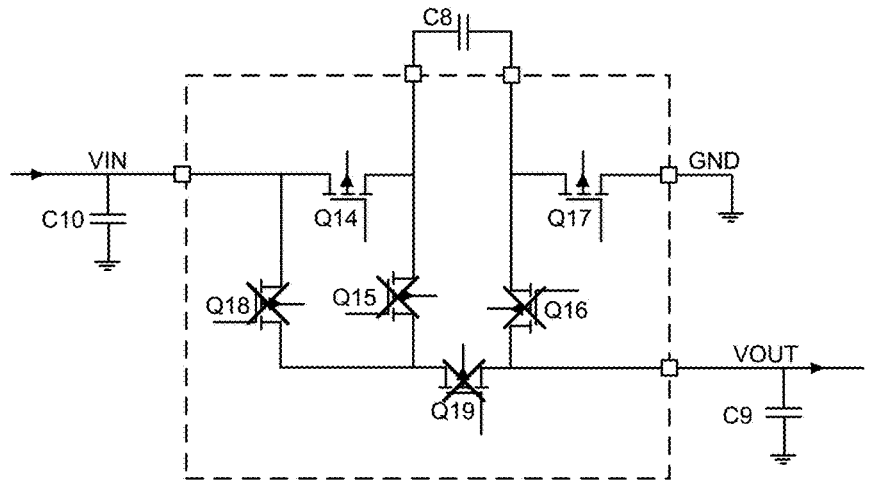
FIG. 13 is a state diagram of the second charge pump circuit module shown in FIG. 12 when a cell is during charging and a charge pump is during charging.
Figure 14:
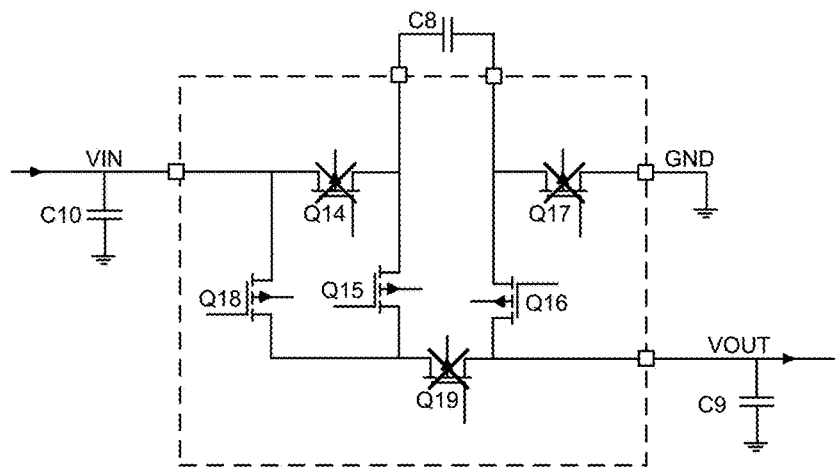
FIG. 14 is a state diagram of the second charge pump circuit module shown in FIG. 12 when the cell is in the charging phase and the charge pump is during discharging.
Figure 15:
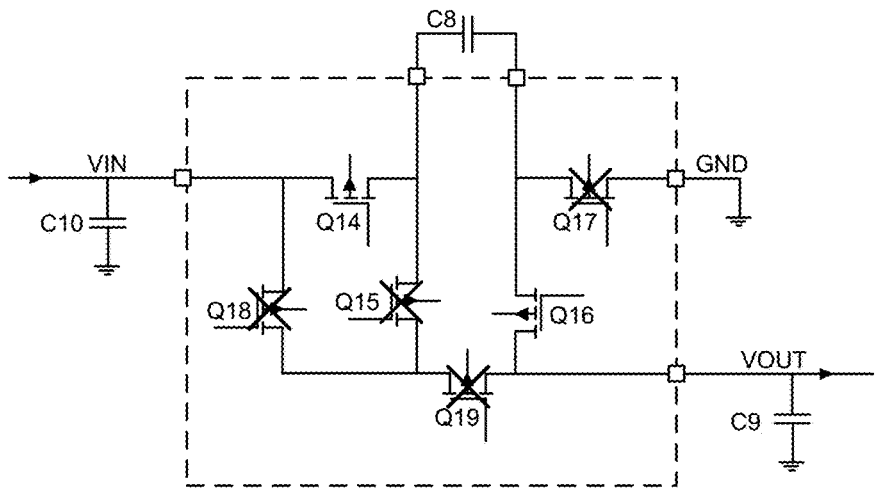
FIG. 15 is a state diagram of the second charge pump circuit module shown in FIG. 12 when the cell is during discharging and the charge pump is in the charging phase.

Referring to FIGS. 13-15, voltage boosting and reducing principles of the second charge pump circuit module are illustrated hereinafter.

During the trickle charging phase, the constant-voltage charging phase, and the charging cut-off phase in the charging process of the dual-cell battery, the voltage is boosted inside the second charge pump circuit module 130. That is, the output voltage is greater than the input voltage, for example, the output voltage is approximately equal to twice the input voltage. Illustratively, a description of the corresponding operation principle the voltage boosting process is as follows.

During phase 1, namely a first charging phase of the second charge pump circuit module, as shown in FIG. 13, the fourteenth transistor Q14 and the seventeenth transistor Q17 are turned on, and other transistors are all disconnected (i.e., turned off). Meanwhile, the eighth capacitor C8 is charged, and the voltage of the eighth capacitor C8 is approximately equal to the input voltage, that is, VIN.

During phase 2, namely a first discharging phase of the second charge pump circuit module, as shown in FIG. 14, the fifteenth transistor Q15, the sixteenth transistor Q16, and the eighteenth transistor Q18 are turned on, and other transistors are disconnected (i.e., turned off). Meanwhile, the input (with the voltage being VIN), the eighth capacitor C8 and the ninth capacitor C9 are connected in series, and the output voltage VOUT is equal to a sum of the voltage of the input and the voltage on the eighth capacitor C8, that is, VOUT=VIN+VC8=2VIN. That is, in this phase, the eighth capacitor C8 is discharged, and the charging voltage in the first charging phase is superimposed on the voltage of the input, so that the output voltage is doubled relative to the input voltage.

During the discharging phase of the dual-cell battery, the voltage is reduced inside the second charge pump circuit module, that is, the output voltage is smaller than the input voltage. For example, the output voltage is approximately equal to half of the input voltage. Illustratively, a corresponding operating principle of the voltage reducing process is as follows.

During phase 3, namely a second charging phase of the second charge pump circuit module, as shown in FIG. 15, the fourteenth transistor Q14 and the seventeenth transistor Q16 are turned on, and other transistors are all disconnected (i.e., turned off). Meanwhile, the eighth capacitor C8 and the ninth capacitor C9 are connected in series, these two capacitors are both charged, and the voltages on the eighth capacitor C8 and the ninth capacitor C9 are both equal to half of the input voltage, that is, VIN/2.

During phase 4, namely a second discharging phase of the second charge pump circuit module, as shown in FIG. 16, the fifteenth transistor Q15, the seventeenth transistor Q17, and the nineteenth transistor Q19 are turned on, and other transistors are all disconnected (i.e., turned off). Meanwhile, the eighth capacitor C8 and the ninth capacitor C9 are connected in parallel. These two capacitors are both discharged, and the output voltage is equal to the charging voltage of the ninth capacitor C9. That is, the output voltage VOUT is equal to the VIN/2. Therefore, the voltage is reduced.

In the above embodiment, the transistors in various circuit modules or submodules may all be a metal-oxide-semiconductor field-effect transistor (MOSFET), or other switching tubes known to those skilled in the art, or any other types of switches, which will not be limited herein.

The dual-cell battery power supply adjusting circuit according to some embodiments of the present disclosure can solve the problem that the charging power of a single-cell battery cannot be greater. Specifically, when the double-cell battery is charged, a charging voltage of the double-cell battery is twice a charging voltage of the single-cell battery, and in the case of the same charging circuit, greater charging power can be realized. For example, charging power of 50 W, 60 W, 100 W or higher can be achieved.

Meanwhile, because the charging voltage of the battery is twice the charging voltage of the original single-cell battery, the charging current of the battery is half of the current of the single-cell battery at the same charging power of the battery. Compared with the single-cell battery, heat generation of a circuit board of the double-cell battery is obviously reduced, thus greatly reducing the heat generation, and in the case of constant output power, an impedance requirement of a battery connector is reduced due to the reduction of the current, which is beneficial for reducing a cost. The reduction of the heat generation is beneficial for providing safety. Meanwhile, the wiring and heat dissipation of the printed circuit board (PCB) of the battery will be relatively easy.

The embodiment of the present disclosure further provides a battery power supply adjusting method, which is executed based on the battery power supply adjusting circuit according to any one of the embodiments above, thus having corresponding beneficial effects.

In some embodiments, FIG. 17 is a flow chart of the battery power supply adjusting method according to some embodiments of the present disclosure. As shown in FIG. 17, the battery power supply adjusting method may include:

S410: collecting, by the battery charging and discharging control module, a charging voltage and a charging current of the dual-cell battery in real time, and determining the charging and discharging phases of the dual-cell battery based on the charging voltage and the charging current;

S420: in the trickle charging phase, controlling, by the battery charging and discharging control module, the Buck circuit module and the second charge pump circuit module to be turned on to operate, wherein the second charge pump circuit module plays a boosting role;

S430: in the constant-current charging phase, controlling, by the battery charging and discharging control module, the first charge pump circuit module to be turned on to operate to make the output current of the first charge pump circuit module smaller than the input current, and make the output voltage of the first charge pump circuit module smaller than the input voltage;

S440: in the constant-voltage charging phase and the charging cut-off phase, controlling, by the battery charging and discharging control module, the first charge pump circuit module to be turned off; and S450: in the discharging phase, controlling, by the battery charging and discharging control module, the second charge pump circuit module to be turned on to convert the discharging voltage of the dual-cell battery into the voltage suitable for the system power supply module.

In the embodiment of the present disclosure, the battery charging and discharging control module is used to control whether other circuit modules operate or not, so as to realize charging and discharging control. Specifically, the battery charging and discharging control module can determine a port type of the AC/DC adapter to assist in determining a current threshold and a voltage threshold in the subsequent steps for switching the charging and discharging phases. The battery charging and discharging control module collects the charging voltage and the charging current of the dual-cell battery in real time, and is set to determine whether the charging voltage is greater than the set voltage threshold and whether the charging current is greater than the set current threshold. If the charging voltage is greater than the set voltage threshold and the charging current is greater than the set current threshold, the battery charging and discharging control module controls the first charge pump circuit module to be turned on, the battery charging and discharging control module will also carry out the boost control protocol with the AC/DC adapter, and control the AC/DC adapter to output a dynamic voltage and a dynamic current to the first charge pump circuit module to charge the dual-cell battery, so as to realize large current charging. In the discharging phase, the battery charging and discharging control module controls the second charge pump circuit module to reduce the voltage to supply power to the system power supply module.

In some embodiments, the determining the charging and discharging phases of the dual-cell battery based on the charging voltage and the charging current, comprises:

identifying, by the charging and discharging control module, a port type of the AC/DC adapter to determine a voltage threshold and a current threshold; and comparing, by the charging and discharging control module, the charging voltage collected in real time with the voltage threshold, and comparing the charging current collected in real time with the current threshold to determine the charging and discharging phases of the dual-cell battery.

Illustratively, in combination with the above, when there are different port types of the AC/DC adapter, there may be different corresponding allowable ranges of the charging current and the charging voltage, so that the identification of the port type of the AC/DC adapter may assist in determining the voltage threshold and the current threshold, so as to compare the voltage threshold and the current threshold with the charging current and the charging voltage collected in real time, thus determining the charging and discharging phases of the dual-cell battery.

In other embodiments, other methods known to those skilled in the art may also be used to determine the charging phase and discharging phase of the dual-cell battery, which will not be repeated and limited herein.

The embodiment of the present disclosure further provides a charging cable, which comprises the battery power supply adjusting circuit according to any one of the embodiments above.

Illustratively, the battery power supply adjusting circuit above may be arranged at one end of the charging cable which is arranged to be connected to the double-cell battery. Therefore, a small current may flow through most cable of the charging cable to reduce the heat generation on the cable, thus reducing the loss of the cable.

The embodiment of the present disclosure further provides a terminal device, which comprises a dual-cell battery, wherein the dual-cell battery is charged by the battery power supply adjusting circuit according to any one of the embodiments above, or charged utilizing the battery power supply adjusting method according to any one of the embodiments above, or charged on the basis of the charging cable according to any one of the embodiments above, thus achieving corresponding beneficial effects.

Illustratively, the battery power supply adjusting circuit may also be arranged in the terminal device and connected to the AC/DC adapter through the charging cable. At this time, there is no battery power supply adjusting circuit in the charging cable, which simplifies a structure of the charging cable.

Illustratively, the terminal device may be a mobile phone, a tablet, a mobile computer or other rechargeable terminal devices known to those skilled in the art, which will not be limited herein.

It should be noted that relational terms, such as "first" and "second", and the like, used herein are only intended to distinguish one entity or operation from another entity or operation, and do not necessarily require or imply that any such actual relationship or sequence exists between these entities or operations. Furthermore, the terms "comprise", "include", or any other variation thereof, are intended to cover a non-exclusive inclusion, so that a process, a method, an article, or equipment that comprises a list of elements not only includes those elements but also includes other elements not expressly listed, or further includes elements inherent to such process, method, article, or equipment. In a case without further limitations, an element defined by the phrase "comprising one . . . " does not preclude the presence of additional identical elements in the process, method, article, or equipment that includes the element.

The foregoing descriptions are only specific embodiments of the present disclosure, such that those skilled in the art can understand or realize the present disclosure. Many modifications to these embodiments will be obvious to those skilled in the art, and general principles defined herein may be realized in other embodiments without departing from the spirit or scope of the present disclosure. Therefore, the present disclosure will not be limited to these embodiments shown herein, but should comply with the widest scope consistent with the principles and novel features disclosed herein.

Industrial Applicability

The first charge pump circuit module and the second charge pump circuit module are arranged in the dual-cell battery power supply adjusting circuit provided by the present disclosure, wherein, in the trickle charging phase, the constant-voltage charging phase and the charging cut-off phase, because the current is small and the heat generation is low, the Buck circuit module is used to reduce the voltage first, on one hand, power is supplied to the system power supply module, and on the other hand, the voltage is boosted by the second charge pump circuit module to charge the dual-cell battery. In the constant-current charging phase, the first charge pump circuit module is used to control the charging current, thus making the output current of the first charge pump circuit module greater than the input current, so that the current transmitted on the charging cable can be reduced when large current charging is realized, and because the charging cable has certain impedance, based on a power calculation formula $I^2R$, the power corresponds to the heat generation; and when the current is reduced, the heat generation is also reduced, which can reduce the heat generation on the charging cable, and similarly, the heat generation on a charging chip and a PCB can be reduced, that is, the heat generation on the whole charging circuit can be reduced, thus ensuring high charging efficiency, thus having very strong industrial practicability.

What is claimed is:

1. A battery power supply adjusting circuit, configured to charge a dual-cell battery, wherein the battery power supply adjusting circuit comprises a Buck circuit module, a first charge pump circuit module, a second charge pump circuit module, a battery charging and discharging control module, and a system power supply module;

wherein an input of the Buck circuit module and an input of the first charge pump circuit module are externally connected to an AC/DC adapter respectively, a first output of the Buck circuit module is connected to the second charge pump circuit module, a second output of the Buck circuit module is connected to the system power supply module, the battery charging and discharging control module is connected to a controlled end of the Buck circuit module, a controlled end of the first charge pump circuit module, a controlled end of the second charge pump circuit module and the dual-cell battery, the first charge pump circuit module and the second charge pump circuit module are respectively connected to the dual-cell battery, and the second charge pump circuit module is further connected to the system power supply module;

wherein the battery charging and discharging control module is a control module for controlling the Buck circuit module, the first charge pump circuit module, and the second charge pump circuit module to operate during charging and discharging;

wherein the Buck circuit module operates in a trickle charging phase, a constant-voltage charging phase, and a charging cut-off phase; wherein the Buck circuit module is configured to supply power to the system power supply module, and wherein the Buck circuit module charges the dual-cell battery after being boosted by the second charge pump circuit module;

wherein the first charge pump circuit module operates in a constant-current charging phase, and is a circuit module for controlling an output current of the first charge pump circuit module, or making an output voltage of the first charge pump circuit module smaller than an input voltage;

wherein the second charge pump circuit module operates during discharging, and is a circuit module for converting a discharging voltage of the dual-cell battery into a voltage suitable for the system power supply module;

wherein a first charge pump circuit sub-module of the first charge pump circuit module comprises a fourth capacitor, a fifth capacitor, a sixth capacitor, a seventh capacitor, a seventh transistor, an eighth transistor, a ninth transistor, a tenth transistor, an eleventh transistor, a twelfth transistor, and a thirteenth transistor;

wherein one end of the fourth capacitor and an input of the seventh transistor are both connected to the AC/DC adapter, wherein the other end of the fourth capacitor is grounded, wherein an output of the seventh transistor and an input of the eighth transistor are both connected to one end of the fifth capacitor, wherein the other end of the fifth capacitor is connected to an input of the ninth transistor and an input of the tenth transistor, wherein an output of the ninth transistor and an output of the thirteenth transistor are both grounded, wherein an input of the thirteenth transistor and an output of the twelfth transistor are both connected to one end of the sixth capacitor, wherein the other end of the sixth capacitor is connected to an output of the tenth transistor and an output of the eleventh transistor, wherein an output of the eighth transistor, an input of the eleventh transistor, an input of the twelfth transistor, and one end of the seventh capacitor are all connected to the dual-cell battery, and the other end of the seventh capacitor is grounded;

wherein during a series connection phase of the capacitors, the seventh transistor, the tenth transistor, and the twelfth transistor are turned on, and the eighth transistor, the ninth transistor, the eleventh transistor, and the thirteenth transistor are turned off; and wherein during a parallel connection phase of the capacitors, the eighth transistor, the ninth transistor, the eleventh transistor, and the thirteenth transistor are turned on, and the seventh transistor, the tenth transistor, and the twelfth transistor are turned off.

2. The battery power supply adjusting circuit according to claim 1, wherein the Buck circuit module comprises a Buck controller, an input capacitor, an output capacitor, an output inductance, and a charging voltage and current controller, and the Buck controller comprises a first transistor and a second transistor;

battery information of a battery being charged is transmitted to the charging voltage and current controller, the first transistor and the output inductance are electrically connected in series between the AC/DC adapter and the battery being charged, the input capacitor is electrically connected in series between an input of the first transistor and the ground, the output capacitor is electrically connected in series between an output of the output inductance and the ground, one end of the second transistor is electrically connected between the first transistor and the output inductance, and the other end of the second transistor is grounded; and a battery being charged is a battery in the dual-cell battery or a battery in the system power supply module;

during charging of the output inductance, the first transistor is turned on and the second transistor is turned off; and during discharging of the output inductance, the first transistor is turned off and the second transistor is turned on.

3. The battery power supply adjusting circuit according to claim 2, wherein the second charge pump circuit module comprises an eighth capacitor, a ninth capacitor, a tenth capacitor, a fourteenth transistor, a fifteenth transistor, a sixteenth transistor, a seventeenth transistor, an eighteenth transistor, and a nineteenth transistor;

one end of the eighth capacitor is connected with an output of the fourteenth transistor and an input of the fifteenth transistor, the other end of the eighth capacitor is connected with an output of the sixteenth transistor and an input of the seventeenth transistor, an output of the seventeenth transistor is grounded, an input of the fourteenth transistor, an input of the eighteenth transistor and one end of the tenth capacitor are all connected with the AC/DC adapter, the other end of the tenth capacitor is grounded, an output of the eighteenth transistor and an output of the fifteenth transistor are both connected with an input of the nineteenth transistor, an input of the sixteenth transistor, an output of the nineteenth transistor and one end of the ninth capacitor are all connected with the dual-cell battery, and the other end of the ninth capacitor is grounded;

during charging of the dual-cell battery, an operation phase of the second charge pump circuit module comprises a first charging phase and a first discharging phase;

in the first charging phase, the fourteenth transistor and the seventeenth transistor are turned on, and the fifteenth transistor, the sixteenth transistor, the eighteenth transistor and the nineteenth transistor are turned off;

in the first discharging phase, the fifteenth transistor, the sixteenth transistor, and the eighteenth transistor are turned on, and the fourteenth transistor, the seventeenth transistor, and the nineteenth transistor are turned off;

during discharging of the dual-cell battery, the operation phase of the second charge pump circuit module comprises a second charging phase and a second discharging phase;

in the second charging phase, the fourteenth transistor and the sixteenth transistor are turned on, and the fifteenth transistor, the seventeenth transistor, the eighteenth transistor, and the nineteenth transistor are turned off; and in the second discharging phase, the fifteenth transistor, the seventeenth transistor, and the nineteenth transistor are turned on, and the fourteenth transistor, the sixteenth transistor, and the eighteenth transistor are turned off.

4. The battery power supply adjusting circuit according to claim 1, wherein the first charge pump circuit module comprises N charge pump circuit sub-modules arranged in parallel; wherein N≥1 and N is an integer; and wherein controlled ends of the N charge pump circuit sub-modules are respectively connected to the battery charging and discharging control module.

5. The battery power supply adjusting circuit according to claim 4, wherein a second charge pump circuit sub-module of the first charge pump circuit module comprises a first capacitor, a second capacitor, a third capacitor, a third transistor, a fourth transistor, a fifth transistor, and a sixth transistor;
    wherein an input of the third transistor and one end of the third capacitor are connected to the AC/DC adapter, the other end of the third capacitor is grounded, an output of the third transistor and an input of the fourth transistor are both connected to a first end of the first capacitor, the other end of the first capacitor is connected to an input of the sixth transistor and an output of the fifth transistor, an output of the sixth transistor is grounded, an output of the fourth transistor, an input of the fifth transistor and one end of the second capacitor are all connected to the dual-cell battery, and the other end of the second capacitor is grounded;
    wherein during a series connection phase of the capacitors, the third transistor and the fifth transistor are turned on, and the fourth transistor and the sixth transistor are turned off, and
    wherein during a parallel connection phase of the capacitors, the fourth transistor and the sixth transistor are turned on, and the third transistor and the fifth transistor are turned off.

6. The battery power supply adjusting circuit according to claim 4, wherein the second charge pump circuit module comprises an eighth capacitor, a ninth capacitor, a tenth capacitor, a fourteenth transistor, a fifteenth transistor, a sixteenth transistor, a seventeenth transistor, an eighteenth transistor, and a nineteenth transistor;
    wherein one end of the eighth capacitor is connected to an output of the fourteenth transistor and an input of the fifteenth transistor, wherein the other end of the eighth capacitor is connected to an output of the sixteenth transistor and an input of the seventeenth transistor, wherein an output of the seventeenth transistor is grounded, wherein an input of the fourteenth transistor, an input of the eighteenth transistor and one end of the tenth capacitor are all connected to the AC/DC adapter, wherein the other end of the tenth capacitor is grounded, wherein an output of the eighteenth transistor and an output of the fifteenth transistor are both connected to an input of the nineteenth transistor, wherein an input of the sixteenth transistor, an output of the nineteenth transistor, and one end of the ninth capacitor are all connected to the dual-cell battery, and wherein the other end of the ninth capacitor is grounded;
    during charging of the dual-cell battery, an operation phase of the second charge pump circuit module comprises a first charging phase and a first discharging phase;
    during the first charging phase, the fourteenth transistor and the seventeenth transistor are turned on, and the fifteenth transistor, the sixteenth transistor, the eighteenth transistor and the nineteenth transistor are turned off;
    during the first discharging phase, the fifteenth transistor, the sixteenth transistor, and the eighteenth transistor are turned on, and the fourteenth transistor, the seventeenth transistor, and the nineteenth transistor are turned off;
    during discharging of the dual-cell battery, the operation phase of the second charge pump circuit module comprises a second charging phase and a second discharging phase;
    wherein during the second charging phase, the fourteenth transistor and the sixteenth transistor are turned on, and the fifteenth transistor, the seventeenth transistor, the eighteenth transistor, and the nineteenth transistor are turned off, and
    wherein during the second discharging phase, the fifteenth transistor, the seventeenth transistor and the nineteenth transistor are turned on, and the fourteenth transistor, the sixteenth transistor and the eighteenth transistor are turned off.

7. A battery power supply adjusting method, executed using a battery power supply adjusting circuit that comprises a Buck circuit module, a first charge pump circuit module, a second charge pump circuit module, a battery charging and discharging control module, and a system power supply module, wherein a first charge pump circuit sub-module of the first charge pump circuit module comprises a fourth capacitor, a fifth capacitor, a sixth capacitor, a seventh capacitor, a seventh transistor, an eighth transistor, a ninth transistor, a tenth transistor, an eleventh transistor, a twelfth transistor, and a thirteenth transistor;
    wherein one end of the fourth capacitor and an input of the seventh transistor are both connected to an AC/DC adapter, wherein the other end of the fourth capacitor is grounded, wherein an output of the seventh transistor and an input of the eighth transistor are both connected to one end of the fifth capacitor, wherein the other end of the fifth capacitor is connected to an input of the ninth transistor and an input of the tenth transistor, wherein an output of the ninth transistor and an output of the thirteenth transistor are both grounded, wherein an input of the thirteenth transistor and an output of the twelfth transistor are both connected to one end of the sixth capacitor, wherein the other end of the sixth capacitor is connected to an output of the tenth transistor and an output of the eleventh transistor, wherein an output of the eighth transistor, an input of the eleventh transistor, an input of the twelfth transistor, and one end of the seventh capacitor are all connected to a dual-cell battery, and the other end of the seventh capacitor is grounded, the method comprising:
    collecting, by the battery charging and discharging control module, a charging voltage and a charging current of the dual-cell battery in real time, and determining charging and discharging phases of the dual-cell battery based on the charging voltage and the charging current;
    in a trickle charging phase, controlling, by the battery charging and discharging control module, the Buck circuit module and the second charge pump circuit module to be turned on to operate, wherein the second charge pump circuit module plays a boosting role;
    in a constant-current charging phase, controlling, by the battery charging and discharging control module, the first charge pump circuit module to be turned on to operate to control an output current of the first charge pump circuit module, or make the output voltage of the first charge pump circuit module smaller than the input voltage;
    in a constant-voltage charging phase and the charging cut-off phase, controlling, by the battery charging and discharging control module, the first charge pump circuit module to be turned off;
    in the discharging phase, controlling, by the battery charging and discharging control module, the second charge pump circuit module to be turned on to convert the discharging voltage of the dual-cell battery into the voltage suitable for the system power supply module;

during a series connection phase of the capacitors, turning on the seventh transistor, the tenth transistor, and the twelfth transistor, and turning off the eighth transistor, the ninth transistor, the eleventh transistor, and the thirteenth transistor; and during a parallel connection phase of the capacitors, turning on the eighth transistor, the ninth transistor, the eleventh transistor, and the thirteenth transistor, and turning off the seventh transistor, the tenth transistor, and the twelfth transistor.

8. The battery power supply adjusting method according to claim 7, determining the charging and discharging phases of the dual-cell battery based on the charging voltage and the charging current, comprises:

identifying, by the battery charging and discharging control module, a port type of an AC/DC adapter to determine a voltage threshold and a current threshold;

comparing, by the battery charging and discharging control module, the charging voltage collected in real time with the voltage threshold; and comparing the charging current collected in real time with the current threshold to determine the charging and discharging phases of the dual-cell battery.

9. A charging cable, comprising:

a battery power supply adjusting circuit, comprising: a Buck circuit module, a first charge pump circuit module, a second charge pump circuit module, a battery charging and discharging control module and a system power supply module;

wherein an input of the Buck circuit module and an input of the first charge pump circuit module are externally connected with an AC/DC adapter respectively, a first output of the Buck circuit module is connected with the second charge pump circuit module, a second output of the Buck circuit module is connected with the system power supply module, the battery charging and discharging control module is connected with a controlled end of the Buck circuit module, a controlled end of the first charge pump circuit module, a controlled end of the second charge pump circuit module and a dual-cell battery, the first charge pump circuit module and the second charge pump circuit module are respectively connected with the dual-cell battery, and the second charge pump circuit module is further connected with the system power supply module;

wherein the battery charging and discharging control module is a control module for controlling the Buck circuit module, the first charge pump circuit module, and the second charge pump circuit module to work during charging and discharging;

wherein the Buck circuit module works in a trickle charging phase, a constant-voltage charging phase and a charging cut-off phase; wherein the Buck circuit module is configured for supplying power to the system power supply module, and wherein the Buck circuit module charges the dual-cell battery after being boosted by the second charge pump circuit module;

wherein the first charge pump circuit module works in a constant-current charging phase, and is a circuit module for controlling an output current of the first charge pump circuit module, or making an output voltage of the first charge pump circuit module smaller than an input voltage;

wherein the second charge pump circuit module works during discharging, and is a circuit module for converting a discharging voltage of the dual-cell battery into a voltage suitable for the system power supply module;

wherein the second charge pump circuit module comprises an eighth capacitor, a ninth capacitor, a tenth capacitor, a fourteenth transistor, a fifteenth transistor, a sixteenth transistor, a seventeenth transistor, an eighteenth transistor, and a nineteenth transistor;

wherein one end of the eighth capacitor is connected with an output of the fourteenth transistor and an input of the fifteenth transistor, the other end of the eighth capacitor is connected with an output of the sixteenth transistor and an input of the seventeenth transistor, an output of the seventeenth transistor is grounded, an input of the fourteenth transistor, an input of the eighteenth transistor and one end of the tenth capacitor are all connected with the AC/DC adapter, the other end of the tenth capacitor is grounded, an output of the eighteenth transistor and an output of the fifteenth transistor are both connected with an input of the nineteenth transistor, an input of the sixteenth transistor, an output of the nineteenth transistor and one end of the ninth capacitor are all connected with the dual-cell battery, and the other end of the ninth capacitor is grounded;

wherein during charging of the dual-cell battery, an operation phase of the second charge pump circuit module comprises a first charging phase and a first discharging phase;

wherein in the first charging phase, the fourteenth transistor and the seventeenth transistor are turned on, and the fifteenth transistor, the sixteenth transistor, the eighteenth transistor and the nineteenth transistor are turned off;

wherein in the first discharging phase, the fifteenth transistor, the sixteenth transistor and the eighteenth transistor are turned on, and the fourteenth transistor, the seventeenth transistor and the nineteenth transistor are turned off;

wherein during discharging of the dual-cell battery, the operation phase of the second charge pump circuit module comprises a second charging phase and a second discharging phase;

wherein in the second charging phase, the fourteenth transistor and the sixteenth transistor are turned on, and the fifteenth transistor, the seventeenth transistor, the eighteenth transistor and the nineteenth transistor are turned off; and wherein in the second discharging phase, the fifteenth transistor, the seventeenth transistor and the nineteenth transistor are turned on, and the fourteenth transistor, the sixteenth transistor and the eighteenth transistor are turned off.

10. The charging cable according to claim 9, wherein the Buck circuit module comprises a Buck controller, an input capacitor, an output capacitor, an output inductance, and a charging voltage and current controller, and the Buck controller comprises a first transistor and a second transistor;

battery information of a battery being charged is transmitted to the charging voltage and current controller, the first transistor and the output inductance are electrically connected in series between the AC/DC adapter and the battery being charged, the input capacitor is electrically connected in series between an input of the first transistor and the ground, the output capacitor is electrically connected in series between an output of the output inductance and the ground, one end of the second transistor is electrically connected between the first transistor and the output inductance, and the other end of the second transistor is grounded; and the battery being charged is a battery in the dual-cell battery or a battery in the system power supply module;

during charging of the output inductance, the first transistor is turned on and the second transistor is turned off; and during discharging of the output inductance, the first transistor is turned off and the second transistor is turned on.

11. The charging cable according to claim 10, wherein the first charge pump circuit module comprises N charge pump circuit sub-modules arranged in parallel; N≥1 and N is an integer; and controlled ends of the N charge pump circuit sub-modules are respectively connected with the battery charging and discharging control module.

12. The charging cable according to claim 11, wherein a first charge pump circuit sub-module of the first charge pump circuit module comprises a first capacitor, a second capacitor, a third capacitor, a third transistor, a fourth transistor, a fifth transistor, and a sixth transistor;

an input of the third transistor and one end of the third capacitor are connected with the AC/DC adapter, the other end of the third capacitor is grounded, an output of the third transistor and an input of the fourth transistor are both connected with a first end of the first capacitor, the other end of the first capacitor is connected with an input of the sixth transistor and an output of the fifth transistor, an output of the sixth transistor is grounded, an output of the fourth transistor, an input of the fifth transistor and one end of the second capacitor are all connected with the dual-cell battery, and the other end of the second capacitor is grounded;

in a series connection phase of the capacitors, the third transistor and the fifth transistor are turned on, and the fourth transistor and the sixth transistor are turned off; and in a parallel connection phase of the capacitors, the fourth transistor and the sixth transistor are turned on, and the third transistor and the fifth transistor are turned off.

13. The charging cable according to claim 12, wherein a second charge pump circuit sub-module of the first charge pump circuit module comprises a fourth capacitor, a fifth capacitor, a sixth capacitor, a seventh capacitor, a seventh transistor, an eighth transistor, a ninth transistor, a tenth transistor, an eleventh transistor, a twelfth transistor and a thirteenth transistor;

one end of the fourth capacitor and an input of the seventh transistor are both connected with the AC/DC adapter, the other end of the fourth capacitor is grounded, an output of the seventh transistor and an input of the eighth transistor are both connected with one end of the fifth capacitor, the other end of the fifth capacitor is connected with an input of the ninth transistor and an input of the tenth transistor, an output of the ninth transistor and an output of the thirteenth transistor are both grounded, an input of the thirteenth transistor and an output of the twelfth transistor are both connected with one end of the sixth capacitor, the other end of the sixth capacitor is connected with an output of the tenth transistor and an output of the eleventh transistor, an output of the eighth transistor, an input of the eleventh transistor, an input of the twelfth transistor and one end of the seventh capacitor are all connected with the dual-cell battery, and the other end of the seventh capacitor is grounded;

in a series connection phase of the capacitors, the seventh transistor, the tenth transistor and the twelfth transistor are turned on, and the eighth transistor, the ninth transistor, the eleventh transistor and the thirteenth transistor are turned off; and in a parallel connection phase of the capacitors, the eighth transistor, the ninth transistor, the eleventh transistor and the thirteenth transistor are turned on, and the seventh transistor, the tenth transistor and the twelfth transistor are turned off.

* * * * *